US010008939B2

(12) United States Patent
Zhang et al.

(10) Patent No.: US 10,008,939 B2
(45) Date of Patent: *Jun. 26, 2018

(54) SYSTEMS AND METHODS FOR PROTECTING POWER CONVERSION SYSTEMS BASED ON AT LEAST FEEDBACK SIGNALS

(71) Applicant: ON-BRIGHT ELECTRONICS (SHANGHAI) CO., LTD., Shanghai (CN)

(72) Inventors: Yunchao Zhang, Shanghai (CN); Yuan Lin, Shanghai (CN); Xiuhong Zhang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/099,419

(22) Filed: Apr. 14, 2016

(65) Prior Publication Data

US 2016/0365792 A1    Dec. 15, 2016

Related U.S. Application Data

(63) Continuation of application No. 13/857,836, filed on Apr. 5, 2013, now Pat. No. 9,350,252, which is a
(Continued)

(30) Foreign Application Priority Data

Feb. 28, 2011  (CN) .......................... 2011 1 0051423
Mar. 12, 2013  (CN) .......................... 2013 1 0078547

(51) Int. Cl.
*H02M 3/335*     (2006.01)
*H02H 7/122*     (2006.01)
(Continued)

(52) U.S. Cl.
CPC ......... *H02M 3/33507* (2013.01); *H02M 1/08* (2013.01); *H02M 1/32* (2013.01); *H02M 3/33523* (2013.01); *H02M 2001/0009* (2013.01)

(58) Field of Classification Search
CPC . H02M 1/32; H02M 3/33507; H02M 3/33523
(Continued)

(56) References Cited

U.S. PATENT DOCUMENTS 3,912,340 A    10/1975  Bertolasi
5,247,241 A    9/1993   Ueda
(Continued)

FOREIGN PATENT DOCUMENTS

CN    1841893 A    10/2006
CN    1917322 A    2/2007
(Continued)

OTHER PUBLICATIONS

United States Patent and Trademark Office, Office Action dated Nov. 22, 2016, in U.S. Appl. No. 13/646,268.
(Continued)

*Primary Examiner* — Adolf Berhane
*Assistant Examiner* — Gary Nash
(74) *Attorney, Agent, or Firm* — Faegre Baker Daniels LLP

(57) ABSTRACT

System and method for protecting a power conversion system. An example system controller includes a protection component and a driving component. The protection component is configured to receive a demagnetization signal generated based on at least information associated with a feedback signal of the power conversion system, process information associated with the demagnetization signal and a detected voltage generated based on at least information associated with the feedback signal, and generate a protec-
(Continued)

tion signal based on at least information associated with the detected voltage and the demagnetization signal. The driving component is configured to receive the protection signal and output a driving signal to a switch configured to affect a primary current flowing through a primary winding of the power conversion system. The detected voltage is related to an output voltage of the power conversion system. The demagnetization signal is related to a demagnetization period of the power conversion system.

28 Claims, 16 Drawing Sheets

Related U.S. Application Data continuation-in-part of application No. 13/071,384, filed on Mar. 24, 2011, now Pat. No. 8,488,342, which is a continuation-in-part of application No. 12/581,775, filed on Oct. 19, 2009, now Pat. No. 8,526,203.

(60) Provisional application No. 61/107,249, filed on Oct. 21, 2008.

(51) Int. Cl.
 *H02M 1/32* (2007.01)
 *H02M 1/08* (2006.01)
 *H02M 1/00* (2006.01)

(58) Field of Classification Search
 USPC ........ 363/21.13, 21.16–21.18, 50, 55, 56.01, 363/56.09–56.11
 See application file for complete search history.

(56) References Cited

U.S. PATENT DOCUMENTS

| | | | |
|---|---|---|---|
| 5,497,119 A * | 3/1996 | Tedrow | G05F 1/465 323/265 |
| 5,568,044 A | 10/1996 | Bittner | |
| 5,729,448 A | 3/1998 | Haynie et al. | |
| 6,134,060 A | 10/2000 | Ryat | |
| 6,292,376 B1 | 9/2001 | Kato | |
| 6,366,066 B1 | 4/2002 | Wilcox | |
| 6,366,070 B1 | 4/2002 | Cooke et al. | |
| 6,381,151 B1 | 4/2002 | Jang | |
| 6,545,513 B2 | 4/2003 | Tsuchida et al. | |
| 6,556,478 B2 | 4/2003 | Willis et al. | |
| 6,713,995 B2 | 3/2004 | Chen | |
| 6,798,086 B2 | 9/2004 | Utsunomiya | |
| 6,947,298 B2 | 9/2005 | Uchida | |
| 6,954,056 B2 | 10/2005 | Hoshino et al. | |
| 6,972,528 B2 | 12/2005 | Shao | |
| 6,972,548 B2 | 12/2005 | Tzeng et al. | |
| 6,977,824 B1 | 12/2005 | Yang et al. | |
| 7,035,119 B2 | 4/2006 | Koike | |
| 7,054,169 B2 | 5/2006 | Huh et al. | |
| 7,116,089 B1 | 10/2006 | Nguyen et al. | |
| 7,173,404 B2 | 2/2007 | Wu | |
| 7,208,927 B1 | 4/2007 | Nguyen | |
| 7,262,587 B2 | 8/2007 | Takimoto et al. | |
| 7,265,999 B2 | 9/2007 | Murata et al. | |
| 7,345,895 B2 | 3/2008 | Zhu et al. | |
| 7,394,634 B2 | 7/2008 | Fang et al. | |
| 7,414,865 B2 | 8/2008 | Yang | |
| 7,456,623 B2 | 11/2008 | Hasegawa et al. | |
| 7,492,619 B2 | 2/2009 | Ye et al. | |
| 7,522,431 B2 | 4/2009 | Huynh et al. | |
| 7,605,576 B2 | 10/2009 | Kanakubo | |
| 7,609,039 B2 | 10/2009 | Hasegawa | |
| 7,684,220 B2 | 3/2010 | Fang et al. | |
| 7,684,462 B2 | 3/2010 | Ye et al. | |
| 7,826,237 B2 | 11/2010 | Zhang et al. | |
| 7,852,055 B2 | 12/2010 | Michishita | |
| 7,898,825 B2 | 3/2011 | Mulligan et al. | |
| 7,990,202 B2 | 8/2011 | Fang et al. | |
| 8,085,027 B2 | 12/2011 | Lin et al. | |
| 8,213,203 B2 | 7/2012 | Fei et al. | |
| 8,305,776 B2 | 11/2012 | Fang | |
| 8,331,112 B2 | 12/2012 | Huang et al. | |
| 8,339,814 B2 | 12/2012 | Zhang et al. | |
| 8,391,028 B2 | 3/2013 | Yeh | |
| 8,488,342 B2 | 7/2013 | Zhang et al. | |
| 8,526,203 B2 | 9/2013 | Huang et al. | |
| 8,879,289 B2 | 11/2014 | Lin et al. | |
| 8,891,256 B2 | 11/2014 | Fang et al. | |
| 8,971,062 B2 | 3/2015 | Huang et al. | |
| 8,982,585 B2 | 3/2015 | Fang | |
| 9,088,217 B2 | 7/2015 | Zhang et al. | |
| 9,325,234 B2 | 4/2016 | Zhang et al. | |
| 9,350,252 B2 | 5/2016 | Zhang et al. | |
| 9,379,623 B2 | 6/2016 | Zhang et al. | |
| 9,379,624 B2 | 6/2016 | Lin et al. | |
| 9,385,612 B2 | 7/2016 | Zhang et al. | |
| 9,559,598 B2 | 1/2017 | Fang et al. | |
| 9,577,537 B2 | 2/2017 | Zhang et al. | |
| 2002/0080625 A1* | 6/2002 | Goyhenetche | H02M 3/156 363/21.01 |
| 2002/0080631 A1 | 6/2002 | Kanouda et al. | |
| 2003/0174520 A1* | 9/2003 | Bimbaud | H02M 3/3385 363/19 |
| 2004/0075600 A1 | 4/2004 | Vera et al. | |
| 2005/0057238 A1 | 3/2005 | Yoshida | |
| 2005/0116697 A1 | 6/2005 | Matsuo et al. | |
| 2005/0222646 A1 | 10/2005 | Kroll et al. | |
| 2005/0270807 A1 | 12/2005 | Strijker | |
| 2006/0034102 A1 | 2/2006 | Yang et al. | |
| 2006/0043953 A1 | 3/2006 | Xu | |
| 2006/0050539 A1 | 3/2006 | Yang et al. | |
| 2006/0055433 A1 | 3/2006 | Yang et al. | |
| 2006/0273772 A1 | 12/2006 | Groom | |
| 2007/0115696 A1 | 5/2007 | Berghegger | |
| 2007/0171687 A1 | 7/2007 | Kogel et al. | |
| 2007/0241733 A1 | 10/2007 | Chen et al. | |
| 2007/0273345 A1 | 11/2007 | Chen et al. | |
| 2008/0061754 A1 | 3/2008 | Hibi | |
| 2008/0112193 A1 | 5/2008 | Yan et al. | |
| 2008/0157742 A1 | 7/2008 | Martin et al. | |
| 2008/0159378 A1 | 7/2008 | Kris | |
| 2008/0225563 A1 | 9/2008 | Seo | |
| 2008/0252345 A1 | 10/2008 | Deschamp et al. | |
| 2009/0051336 A1 | 2/2009 | Hartlieb et al. | |
| 2009/0058387 A1 | 3/2009 | Huynh et al. | |
| 2009/0073727 A1 | 3/2009 | Huynh et al. | |
| 2009/0121697 A1 | 5/2009 | Aiura et al. | |
| 2009/0141520 A1 | 6/2009 | Grande et al. | |
| 2009/0175057 A1 | 7/2009 | Grande et al. | |
| 2009/0206814 A1 | 8/2009 | Zhang et al. | |
| 2009/0219000 A1 | 9/2009 | Yang | |
| 2009/0251219 A1 | 10/2009 | Fiocchi et al. | |
| 2009/0302817 A1 | 12/2009 | Nagai | |
| 2010/0026270 A1 | 2/2010 | Yang et al. | |
| 2010/0061126 A1 | 3/2010 | Huynh et al. | |
| 2010/0128501 A1 | 5/2010 | Huang et al. | |
| 2010/0141178 A1 | 6/2010 | Negrete et al. | |
| 2010/0219802 A1 | 9/2010 | Lin et al. | |
| 2010/0225293 A1 | 9/2010 | Wang et al. | |
| 2011/0044076 A1 | 2/2011 | Zhang et al. | |
| 2011/0096574 A1 | 4/2011 | Huang | |
| 2011/0149614 A1 | 6/2011 | Stracquadaini | |
| 2011/0182089 A1 | 7/2011 | genannt Berghegger | |
| 2011/0248770 A1 | 10/2011 | Fang et al. | |
| 2011/0267853 A1 | 11/2011 | Yang et al. | |
| 2012/0013321 A1 | 1/2012 | Huang et al. | |
| 2012/0075891 A1 | 3/2012 | Zhang et al. | |
| 2012/0139435 A1 | 6/2012 | Storm | |
| 2012/0147630 A1 | 6/2012 | Cao et al. | |
| 2012/0153919 A1 | 6/2012 | Garbossa et al. | |
| 2012/0195076 A1 | 8/2012 | Zhang et al. | |
| 2012/0224397 A1 | 9/2012 | Yeh | |
| 2012/0257423 A1 | 10/2012 | Fang | |
| 2012/0281438 A1 | 11/2012 | Fang et al. | |

(56) References Cited

U.S. PATENT DOCUMENTS

| | | |
|---|---|---|
| 2012/0300508 A1 | 11/2012 | Fang |
| 2012/0320640 A1 | 12/2012 | Baurle et al. |
| 2013/0027989 A1 | 1/2013 | Fang |
| 2013/0033905 A1 | 2/2013 | Lin et al. |
| 2013/0051090 A1 | 2/2013 | Xie et al. |
| 2013/0182476 A1 | 7/2013 | Yang et al. |
| 2013/0223107 A1 | 8/2013 | Zhang et al. |
| 2013/0272033 A1 | 10/2013 | Zhang et al. |
| 2013/0308350 A1 | 11/2013 | Huang et al. |
| 2014/0078790 A1 | 3/2014 | Lin et al. |
| 2014/0160809 A1 | 6/2014 | Lin et al. |
| 2014/0268920 A1 | 9/2014 | Fang et al. |
| 2015/0055378 A1 | 2/2015 | Lin et al. |
| 2015/0162820 A1 | 6/2015 | Zhang et al. |
| 2015/0180347 A1 | 6/2015 | Fang et al. |
| 2015/0295499 A1 | 10/2015 | Zhang et al. |
| 2015/0311804 A1 | 10/2015 | Fang |
| 2016/0028318 A1 | 1/2016 | Fang et al. |
| 2016/0218631 A1 | 7/2016 | Zhang et al. |
| 2016/0315543 A1 | 10/2016 | Zhang et al. |
| 2016/0329818 A1 | 11/2016 | Lin et al. |
| 2016/0329821 A1 | 11/2016 | Zhang et al. |
| 2017/0187293 A1 | 6/2017 | Fang et al. |

FOREIGN PATENT DOCUMENTS

| | | |
|---|---|---|
| CN | 1929274 A | 3/2007 |
| CN | 1964172 A | 5/2007 |
| CN | 1988347 A | 6/2007 |
| CN | 101034851 A | 9/2007 |
| CN | 101039077 A | 9/2007 |
| CN | 101079576 A | 11/2007 |
| CN | 101127495 A | 2/2008 |
| CN | 101247083 A | 8/2008 |
| CN | 101295872 A | 10/2008 |
| CN | 101350562 A | 1/2009 |
| CN | 101515756 A | 8/2009 |
| CN | 101552560 A | 10/2009 |
| CN | 101577468 A | 11/2009 |
| CN | 101577488 A | 11/2009 |
| CN | 101826796 A | 9/2010 |
| CN | 101515756 B | 11/2011 |
| CN | 102332826 A | 1/2012 |
| CN | 102474964 A | 5/2012 |
| CN | 102624237 A | 8/2012 |
| CN | 102651613 A | 8/2012 |
| CN | 102709880 A | 10/2012 |
| CN | 102723945 A | 10/2012 |
| CN | 102983760 A | 3/2013 |
| CN | 103166198 A | 6/2013 |
| CN | 103296904 A | 9/2013 |
| TW | 200840174 A | 10/2008 |
| TW | 200937157 A | 9/2009 |
| TW | I 437808 | 5/2014 |
| TW | I 448060 | 8/2014 |

OTHER PUBLICATIONS

United States Patent and Trademark Office, Notice of Allowance dated Sep. 22, 2016, in U.S. Appl. No. 14/293,280.
United States Patent and Trademark Office, Notice of Allowance dated Oct. 21, 2016, in U.S. Appl. No. 14/684,047.
United States Patent and Trademark Office, Notice of Allowance dated Oct. 13, 2016, in U.S. Appl. No. 14/488,176.
United States Patent and Trademark Office, Office Action dated Nov. 2, 2016, in U.S. Appl. No. 14/824,018.
Chinese Patent Office, Office Action dated Dec. 8, 2014, in Application No. 201110034669.9.
Chinese Patent Office, Office Action dated Jun. 4, 2014, in Application No. 201110144768.2.
Chinese Patent Office, Office Action dated Nov. 12, 2013, in Application No. 201110051423.2.
Chinese Patent Office, Office Action dated Nov. 14, 2013, in Application No. 201110224933.5.
Chinese Patent Office, Office Action dated Nov. 5, 2013, in Application No. 201210529679.4.
Chinese Patent Office, Office Action dated Dec. 4, 2015, in Application No. 201410226277.6.
Chinese Patent Office, Office Action dated Nov. 5, 2013, in Application No. 201310078547.9.
Chinese Patent Office, Office Action dated Nov. 25, 2015, in Application Application No. 201310656906.4.
Chinese Patent Office, Office Action dated Nov. 7, 2013, in Application No. 201210342097.5.
Taiwan Patent Office, Office Action dated Mar. 3, 2014, in Application No. 100127088.
Taiwan Patent Office, Office Action dated May 6, 2015, in Application No. 102116550.
Taiwan Patent Office, Office Action dated Oct. 1, 2014, in Application No. 102116551.
Taiwan Patent Office, Office Action dated Oct. 16, 2015, in Application No. 102116550.
Taiwan Patent Office, Office Action dated Oct. 6, 2014, in Application No. 102115002.
United States Patent and Trademark Office, Notice of Allowance dated Aug. 7, 2015, in U.S. Appl. No. 14/151,209.
United States Patent and Trademark Office, Notice of Allowance dated Nov. 16, 2015, in U.S. Appl. No. 14/151,209.
United States Patent and Trademark Office, Notice of Allowance dated Jan. 20, 2015, in U.S. Appl. No. 12/859,138.
United States Patent and Trademark Office, Notice of Allowance dated Jul. 30, 2014, in U.S. Appl. No. 12/859,138.
United States Patent and Trademark Office, Notice of Allowance dated Jun. 22, 2015, in U.S. Appl. No. 13/052,869.
United States Patent and Trademark Office, Notice of Allowance dated Oct. 2, 2015, in U.S. Appl. No. 13/052,869.
United States Patent and Trademark Office, Notice of Allowance dated Jan. 8, 2016, in U.S. Appl. No. 13/052,869.
United States Patent and Trademark Office, Corrected Notice of Allowability dated May 26, 2016, in U.S. Appl. No. 13/052,869.
United States Patent and Trademark Office, Notice of Allowance dated Oct. 2, 2015, in U.S. Appl. No. 13/722,788.
United States Patent and Trademark Office, Notice of Allowance dated Feb. 1, 2016, in U.S. Appl. No. 13/722,788.
United States Patent and Trademark Office, Notice of Allowance dated Oct. 5, 2015, in U.S. Appl. No. 13/915,477.
United States Patent and Trademark Office, Notice of Allowance dated Feb. 22, 2016, in U.S. Appl. No. 13/915,477.
United States Patent and Trademark Office, Notice of Allowance dated Sep. 30, 2015, in U.S. Appl. No. 13/857,836.
United States Patent and Trademark Office, Office Action dated Apr. 1, 2014, in U.S. Appl. No. 13/052,869.
United States Patent and Trademark Office, Office Action dated Aug. 20, 2015, in U.S. Appl. No. 13/646,268.
United States Patent and Trademark Office, Office Action dated May 17, 2016, in U.S. Appl. No. 13/646,268.
United States Patent and Trademark Office, Office Action dated Dec. 5, 2012, in U.S. Appl. No. 12/859,138.
United States Patent and Trademark Office, Office Action dated Feb. 15, 2013, in U.S. Appl. No. 13/052,869.
United States Patent and Trademark Office, Office Action dated Feb. 24, 2015, in U.S. Appl. No. 13/722,788.
United States Patent and Trademark Office, Office Action dated Jul. 31, 2013, in U.S. Appl. No. 12/859,138.
United States Patent and Trademark Office, Office Action dated Mar. 12, 2015, in U.S. Appl. No. 13/857,836.
United States Patent and Trademark Office, Notice of Allowance dated Feb. 10, 2016, in U.S. Appl. No. 13/857,836.
United States Patent and Trademark Office, Office Action dated Mar. 12, 2015, in U.S. Appl. No. 13/915,477.
United States Patent and Trademark Office, Office Action dated Nov. 5, 2014, in U.S. Appl. No. 13/052,869.
United States Patent and Trademark Office, Office Action dated Oct. 1, 2013, in U.S. Appl. No. 13/052,869.

(56) References Cited

OTHER PUBLICATIONS

United States Patent and Trademark Office, Office Action dated Mar. 7, 2016, in U.S. Appl. No. 14/293,280.
United States Patent and Trademark Office, Notice of Allowance dated Apr. 21, 2016, in U.S. Appl. No. 14/684,047.
United States Patent and Trademark Office, Office Action dated Apr. 20, 2016, in U.S. Appl. No. 14/488,176.
United States Patent and Trademark Office, Notice of Allowance dated Jul. 26, 2017, in U.S. Appl. No. 13/646,268.
United States Patent and Trademark Office, Office Action dated Jun. 30, 2017, in U.S. Appl. No. 14/824,018.
United States Patent and Trademark Office, Notice of Allowance dated Jul. 5, 2017, in U.S. Appl. No. 15/040,674.
United States Patent and Trademark Office, Office Action dated May 26, 2017, in U.S. Appl. No. 15/081,523.
United States Patent and Trademark Office, Office Action dated Mar. 22, 2017, in U.S. Appl. No. 15/152,362.
United States Patent and Trademark Office, Office Action dated Mar. 30, 2017, in U.S. Appl. No. 15/376,290.
United States Patent and Trademark Office, Office Action dated Dec. 29, 2016, in U.S. Appl. No. 15/040,674.
United States Patent and Trademark Office, Notice of Allowance dated Sep. 19, 2017, in U.S. Appl. No. 13/646,268.
United States Patent and Trademark Office, Notice of Allowance dated Sep. 11, 2017, in U.S. Appl. No. 15/040,674.
United States Patent and Trademark Office, Office Action dated Aug. 29, 2017, in U.S. Appl. No. 15/098,002.
United States Patent and Trademark Office, Office Action dated Aug. 8, 2017, in U.S. Appl. No. 15/376,290.
United States Patent and Trademark Office, Notice of Allowance dated Nov. 14, 2017, in U.S. Appl. No. 14/824,018.
United States Patent and Trademark Office, Notice of Allowance dated Jan. 18, 2018, in U.S. Appl. No. 14/824,018.
United States Patent and Trademark Office, Notice of Allowance dated Dec. 1, 2017, in U.S. Appl. No. 15/081,523.
United States Patent and Trademark Office, Office Action dated Dec. 18, 2017, in U.S. Appl. No. 15/152,362.
United States Patent and Trademark Office, Notice of Allowance dated Nov. 17, 2017, in U.S. Appl. No. 15/376,290.
United States Patent and Trademark Office, Notice of Allowance dated Feb. 23, 2018, in U.S. Appl. No. 15/081,523.
United States Patent and Trademark Office, Office Action dated Feb. 23, 2018, in U.S. Appl. No. 15/098,002.
United States Patent and Trademark Office, Office Action dated Mar. 20, 2018, in U.S Appl. No. 15/835,344.
United States Patent and Trademark Office, Notice of Allowance dated Mar. 28, 2018, in U.S Appl. No. 15/835,337.
United States Patent and Trademark Office, Office Action dated Mar. 20, 2018, in U.S Appl. No. 15/849,438.

* cited by examiner

SYSTEMS AND METHODS FOR PROTECTING POWER CONVERSION SYSTEMS BASED ON AT LEAST FEEDBACK SIGNALS

1. CROSS-REFERENCES TO RELATED APPLICATIONS

This application is a continuation of U.S. patent application Ser. No. 13/857,836, filed Apr. 5, 2013, which claims priority to Chinese Patent Application No. 201310078547.9, filed Mar. 12, 2013, both of these applications being commonly assigned and incorporated by reference herein for all purposes. In addition, U.S. patent application Ser. No. 13/857,836 is a continuation-in-part of U.S. patent application Ser. No. 13/071,384, filed Mar. 24, 2011, claiming priority to Chinese Patent Application No. 201110051423.2, filed Feb. 28, 2011, all of these applications being commonly assigned and incorporated by reference herein for all purposes. Moreover, U.S. patent application Ser. No. 13/071,384 is a continuation-in-part of U.S. patent application Ser. No. 12/581,775, filed Oct. 19, 2009, claiming priority to U.S. Provisional No. 61/107,249, filed Oct. 21, 2008, both of these applications being commonly assigned and incorporated by reference herein for all purposes.

Additionally, this application is related to U.S. patent application Ser. No. 12/502,866, commonly assigned, incorporated by reference herein for all purposes.

2. BACKGROUND OF THE INVENTION

The present invention is directed to integrated circuits. More particularly, the invention provides a system and method for protecting a power conversion system based on at least a feedback signal. Merely by way of example, the invention has been applied to a flyback power conversion system. But it would be recognized that the invention has a much broader range of applicability.

Generally, a conventional power conversion system often uses a transformer to isolate the input voltage on the primary side and the output voltage on the secondary side. To regulate the output voltage, certain components, such as TL431 and an opto-coupler, can be used to transmit a feedback signal from the secondary side to a controller chip on the primary side. Alternatively, the output voltage on the secondary side can be imaged to the primary side, so the output voltage is controlled by directly adjusting some parameters on the primary side. Then, some components, such as TL431 and an opto-coupler, can be omitted to reduce the system costs.

FIG. 1 is a simplified diagram showing a conventional flyback power conversion system with primary-side sensing and regulation. The power conversion system 100 includes a primary winding 110, a secondary winding 112, an auxiliary winding 114, a power switch 120, a current sensing resistor 130, an equivalent resistor 140 for an output cable, resistors 150 and 152, and a rectifying diode 160. For example, the power switch 120 is a bipolar junction transistor. In another example, the power switch 120 is a MOS transistor.

To regulate the output voltage within a predetermined range, information related to the output voltage and the output loading often needs to be extracted. For example, when the power conversion system 100 operates in a discontinuous conduction mode (DCM), such information can be extracted through the auxiliary winding 114. When the power switch 120 is turned on, the energy is stored in the secondary winding 112. Then, when the power switch 120 is turned off, the stored energy is released to the output terminal during a demagnetization process. The voltage of the auxiliary winding 114 maps the output voltage on the secondary side as shown below.

$$V_{FB} = \frac{R_2}{R_1 + R_2} \times V_{aux} = k \times n \times (V_o + V_F + I_o \times R_{eq}) \quad \text{(Equation 1)}$$

where $V_{FB}$ represents a voltage at a node 154, and $V_{aux}$ represents the voltage of the auxiliary winding 114. $R_1$ and $R_2$ represent the resistance values of the resistors 150 and 152 respectively. Additionally, n represents a turns ratio between the auxiliary winding 114 and the secondary winding 112. Specifically, n is equal to the number of turns of the auxiliary winding 114 divided by the number of turns of the secondary winding 112. $V_o$ and $I_o$ represent the output voltage and the output current respectively. Moreover, $V_F$ represents the forward voltage of the rectifying diode 160, and $R_{eq}$ represents the resistance value of the equivalent resistor 140. Also, k represents a feedback coefficient as shown below:

$$k = \frac{R_2}{R_1 + R_2} \quad \text{(Equation 2)}$$

FIG. 2 is a simplified diagram showing a conventional operation mechanism for the flyback power conversion system 100. As shown in FIG. 2, the controller chip of the conversion system 100 uses a sample-and-hold mechanism. When the demagnetization process on the secondary side is almost completed and the current $I_{sec}$ of the secondary winding 112 almost becomes zero, the voltage $V_{aux}$ of the auxiliary winding 114 is sampled at, for example, point A of FIG. 2. The sampled voltage value is usually held until the next voltage sampling is performed. Through a negative feedback loop, the sampled voltage value can become equal to a reference voltage $V_{ref}$. Therefore, $$V_{FB} = V_{ref} \quad \text{(Equation 3)}$$

Combining Equations 1 and 3, the following can be obtained:

$$V_o = \frac{V_{ref}}{k \times n} - V_F - I_o \times R_{eq} \quad \text{(Equation 4)}$$

Based on Equation 4, the output voltage decreases with the increasing output current.

Additionally, in the discontinuous conduction mode (DCM), the flyback power conversion system 100 can also regulate the output current regardless of the output voltage based on information associated with the waveform for the voltage $V_{aux}$ of the auxiliary winding 114 as shown in FIG. 2.

For example, the output current is equal to an average of a secondary current 198 flowing through the secondary winding 112 during a switching period which includes a demagnetization period corresponding to the demagnetization process.

$$I_{out} = \frac{1}{2} I_{sec\_pk} \frac{T_{dem}}{T_s} \quad \text{(Equation 5)}$$

where $I_{out}$ represents the output current, $I_{sec\_pk}$ represents the magnitude of the secondary current 198 when the switch 120 is turned off, $T_{dem}$ represents the duration of the demagnetization period, and $T_s$ represents the duration of the switching period.

As an example, according to Equation 5, the output current can be determined as follows:

$$I_{out} = \frac{1}{2} N \frac{1}{T} \int_0^T \frac{V_{cs}}{R_s} \frac{T_{dem}}{T_s} dt \qquad \text{(Equation 6)}$$

where N represents the turns ratio between the primary winding 110 and the secondary winding 112, $R_s$ represents the resistance of the resistor 130, T represents an integration period, and $V_{cs}$ represents a peak current-sensing signal associated with a primary current 196 flowing through the primary winding 110 in each switching cycle.

According to Equation 6, if $V_{cs}$ and $T_{dem}/T_s$ do not change much, the output current may be regulated regardless of the input voltage, the output voltage, or the inductance of the transformer including the primary winding 110 and the secondary winding 112, so the power conversion system 100 operates, for example, in a constant-current mode.

But when the power conversion system 100 operates in the constant-current mode, the power conversion system 100 needs to be protected. Hence it is highly desirable to improve the techniques of system protection.

3. BRIEF SUMMARY OF THE INVENTION

The present invention is directed to integrated circuits. More particularly, the invention provides a system and method for protecting a power conversion system based on at least a feedback signal. Merely by way of example, the invention has been applied to a flyback power conversion system. But it would be recognized that the invention has a much broader range of applicability.

According to one embodiment, a system controller for protecting a power conversion system includes a protection component and a driving component. The protection component is configured to receive a demagnetization signal generated based on at least information associated with a feedback signal of the power conversion system, process information associated with the demagnetization signal and a detected voltage generated based on at least information associated with the feedback signal, and generate a protection signal based on at least information associated with the detected voltage and the demagnetization signal. The driving component is configured to receive the protection signal and output a driving signal to a switch configured to affect a primary current flowing through a primary winding of the power conversion system. The detected voltage is related to an output voltage of the power conversion system. The demagnetization signal is related to a demagnetization period of the power conversion system. The protection component and the driving component are further configured to, if the detected voltage and the demagnetization signal satisfy one or more conditions, output the driving signal to cause the switch to open and remain open in order to protect the power conversion system.

According to another embodiment, a system controller for protecting a power conversion system includes a protection component and a driving component. The protection component is configured to receive a demagnetization signal generated based on at least information associated with a feedback signal of the power conversion system, receive a current-sensing signal associated with a primary current flowing through a primary winding of the power conversion system, process information associated with the demagnetization signal, the current-sensing signal, and a detected voltage generated based on at least information associated with the feedback signal, and generate a protection signal based on at least information associated with the detected voltage, the demagnetization signal, and the current-sensing signal. The driving component is configured to receive the protection signal and output a driving signal to a switch configured to affect the primary current flowing through the primary winding. The detected voltage is related to an output voltage of the power conversion system. The demagnetization signal is related to a demagnetization period of the power conversion system. The protection component and the driving component are further configured to, if the detected voltage, the demagnetization signal and the current-sensing signal satisfy one or more conditions, output the driving signal to cause the switch to open and remain open in order to protect the power conversion system.

In one embodiment, a method for protecting a power conversion system includes, receiving a demagnetization signal generated based on at least information associated with a feedback signal of the power conversion system, processing information associated with the demagnetization signal and a detected voltage generated based on at least information associated with the feedback signal, and generating a protection signal based on at least information associated with the detected voltage and the demagnetization signal. The method further includes, receiving the protection signal, generating a driving signal based on at least information associated with the protection signal, and outputting the driving signal to a switch configured to affect a primary current flowing through a primary winding of the power conversion system. The detected voltage is related to an output voltage of the power conversion system. The demagnetization signal is related to a demagnetization period of the power conversion system. The process for outputting a driving signal to a switch configured to affect a primary current flowing through a primary winding of the power conversion system includes, if the detected voltage and the demagnetization signal satisfy one or more conditions, outputting the driving signal to cause the switch to open and remain open in order to protect the power conversion system.

In another embodiment, a method for protecting a power conversion system includes, receiving a demagnetization signal generated based on at least information associated with a feedback signal of the power conversion system, receiving a current-sensing signal associated with a primary current flowing through a primary winding of the power conversion system, and processing information associated with the demagnetization signal, the current-sensing signal, and a detected voltage generated based on at least information associated with the feedback signal. The method further includes, generating a protection signal based on at least information associated with the detected voltage, the demagnetization signal, and the current-sensing signal, receiving the protection signal, generating a driving signal based on at least information associated with the protection signal, and outputting the driving signal to a switch configured to affect the primary current flowing through the primary winding. The detected voltage is related to an output voltage of the power conversion system. The demagnetization signal is related to a demagnetization period of the power conversion system. The process for outputting a driving signal to a switch configured to affect the primary current flowing through the primary winding includes, if the detected voltage, the demagnetization signal and the current-sensing signal satisfy one or more conditions, outputting the driving signal to cause the switch to open and remain open in order to protect the power conversion system.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides a system and method for protecting a power conversion system based on at least a feedback signal. Merely by way of example, the invention has been applied to a flyback power conversion system. But it would be recognized that the invention has a much broader range of applicability.

Figure 1:
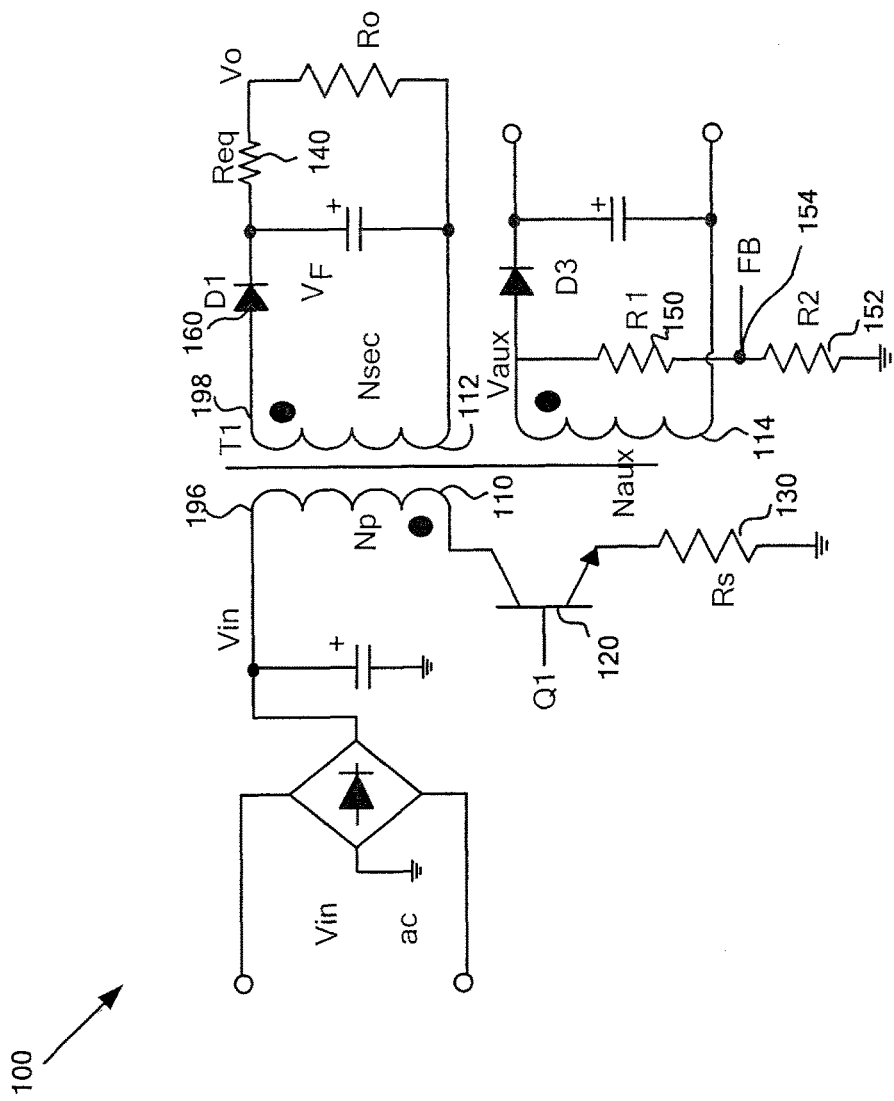
FIG. 1 is a simplified diagram showing a conventional flyback power conversion system with primary-side sensing and regulation.
Figure 2:
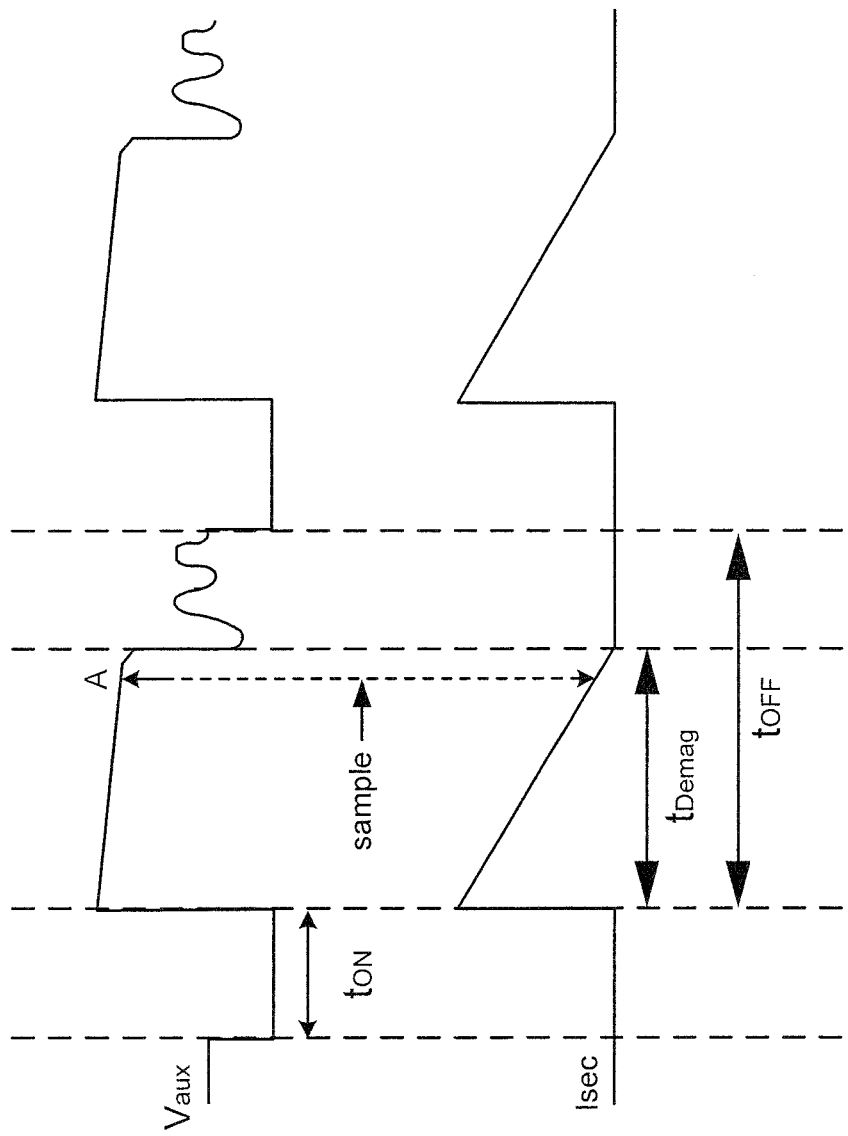
FIG. 2 is a simplified diagram showing a conventional operation mechanism for the flyback power conversion system as shown in FIG. 1.
Figure 3:
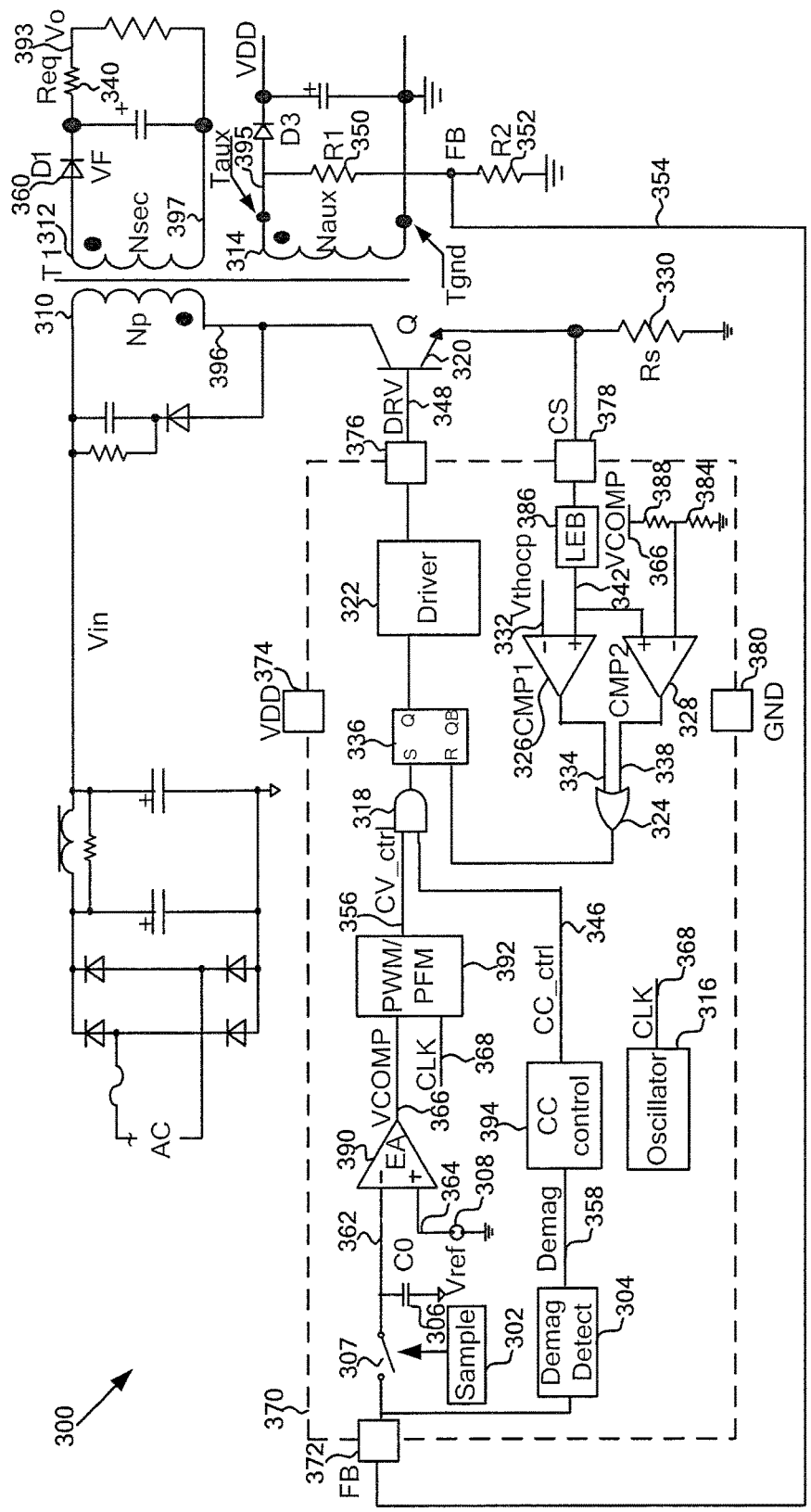
FIG. 3 is a simplified diagram showing a power conversion system with primary-side sensing and regulation.

FIG. 3 is a simplified diagram showing a power conversion system with primary-side sensing and regulation. The power conversion system 300 includes a primary winding 310, a secondary winding 312, an auxiliary winding 314, a power switch 320, a current sensing resistor 330, an equivalent resistor 340 for an output cable, resistors 350 and 352, a rectifying diode 360, and a controller 370. The controller 370 includes a sampling component 302, a demagnetization detector 304, a capacitor 306, a switch 307, a reference-signal generator 308, an oscillator 316, an AND gate 318, a driving component 322, an OR gate 324, comparators 326 and 328, a flip-flop component 336, a leading edge blanking (LEB) component 386, resistors 384 and 388, an error amplifier 390, a modulation component 392, and a constant-current (CC) component 394. For example, the power switch 320 is a bipolar transistor. In another example, the power switch 320 is a MOS transistor. In yet another example, the controller 370 includes terminals 372, 374, 376, 378 and 380.

For example, the auxiliary winding 314 is magnetically coupled to the secondary winding 312, which, with one or more other components, generates an output voltage 393. In another example, information related to the output voltage is processed by a voltage divider of the resistors 350 and 352, and is used to generate a feedback voltage 354, which is received by the terminal 372 (e.g., terminal FB) of the controller 370. In yet another example, the sampling component 302 samples the feedback voltage 354 and the sampled signal is held at the capacitor 306. As an example, the error amplifier 390 compares the sampled-and-held voltage 362 with a reference signal 364 generated by the reference-signal generator 308, and outputs a comparison signal 366 associated with the error of the sampled-and-held voltage 362 with respect to the reference signal 364. As another example, the comparison signal 366 is received by the modulation component 392 which receives a clock signal 368 from the oscillator 316 and outputs a modulation signal 356 (e.g., CV_ctrl). For example, the comparison signal 366 is used to control the pulse width for pulse-width modulation (PWM) and/or the switching frequency for pulse-frequency modulation (PFM) in order to regulate the output voltage in the constant voltage mode. In another example, the demagnetization detector 304 determines the duration of a demagnetization period based on the feedback voltage 354 and outputs a detection signal 358 to the constant-current component 394 which generates a signal 346 (e.g., CC_ctrl). In yet another example, both the modulation signal 356 and the signal 346 are received by the AND gate 318 to affect the flip-flop component 336 and in turn the driving component 322. In yet another example, the driving component 322 outputs a driving signal 348 through the terminal 376 to affect the status of the switch 320. In yet another example, a primary current 396 flowing through the primary winding 310 is sensed using the resistor 330, and a current-sensing signal 342 is generated through the LEB component 386 and received by the comparators 326 and 328. In yet another example, the comparator 326 and the comparator 328 output comparison signals 334 and 338 respectively, to the OR gate 324 to affect the flip-flop component 336.

As an example, when the sampled-and-held voltage 362 is smaller than the reference signal 364 in magnitude, the error amplifier 390 outputs the comparison signal 366 at a logic high level. The power conversion system 300 operates in the constant-current mode, in some embodiments.

Figure 4:
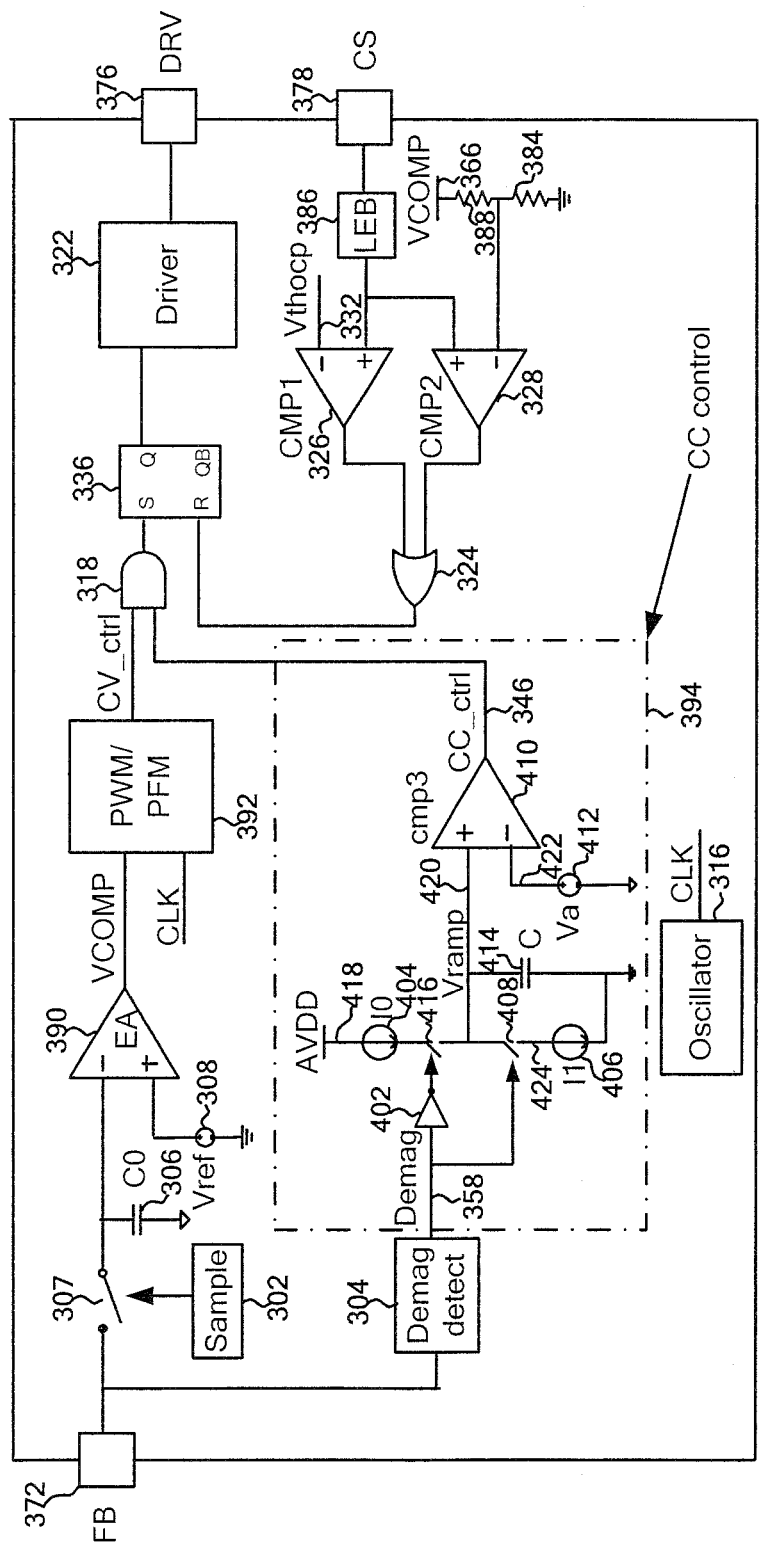
FIG. 4 is a simplified diagram showing at least certain components of the constant-current component as part of the power conversion system as shown in FIG. 3.

FIG. 4 is a simplified diagram showing at least certain components of the constant-current component 394 as part of the power conversion system 300. The constant-current component 394 includes a NOT gate 402, current sources 404 and 406, a switch 408, a capacitor 414, a comparator 410 and a reference-signal generator 412.

For example, when the detection signal 358 is at a logic low level, the switch 408 is open (e.g., being turned off) and the switch 416 is closed (e.g., being turned on). In another example, the current source 404 provides a current 418 (e.g., $I_0$) to charge the capacitor 414, and in response a signal 420 increases in magnitude. As an example, when the detection signal 358 is at a logic high level, the switch 416 is open (e.g., being turned off) and the switch 408 is closed (e.g., being turned on). As another example, the capacitor 414 is discharged through the current source 406 which provides a current 424 (e.g., $I_1$), and the signal 420 decreases in magnitude. For example, the comparator 410 receives the signal 420 and a reference signal 422 generated by the reference-signal generator 412 and outputs the signal 346.

Figure 5:
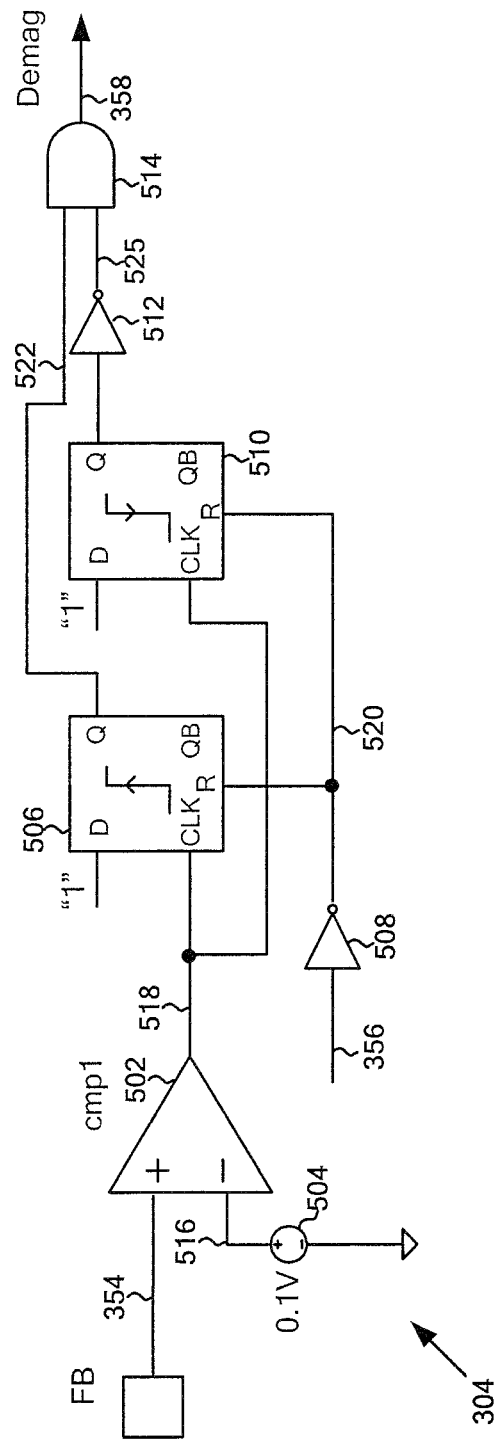
FIG. 5 is a simplified diagram showing at least certain components of the demagnetization detector as part of the power conversion system as shown in FIG. 3.

FIG. 5 is a simplified diagram showing at least certain components of the demagnetization detector 304 as part of the power conversion system 300. The demagnetization detector 304 includes a comparator 502, a reference-signal generator 504, flip-flop components 506 and 510, NOT gates 508 and 512, and an AND gate 514. For example, the comparator 502 compares the feedback signal 354 with a reference signal 516 (e.g., 0.1 V) generated by the reference-signal generator 504, and outputs a comparison signal 518 which is received by the flip-flop components 506 and 510. In another example, the NOT gate 508 receives the modulation signal 356 and outputs a signal 520 to the flip-flop components 506 and 510. In yet another example, the AND gate 514 receives a signal 522 from the flip-flop component 506 and a signal 525 from the NOT gate 512 and outputs the detection signal 358.

Figure 6:
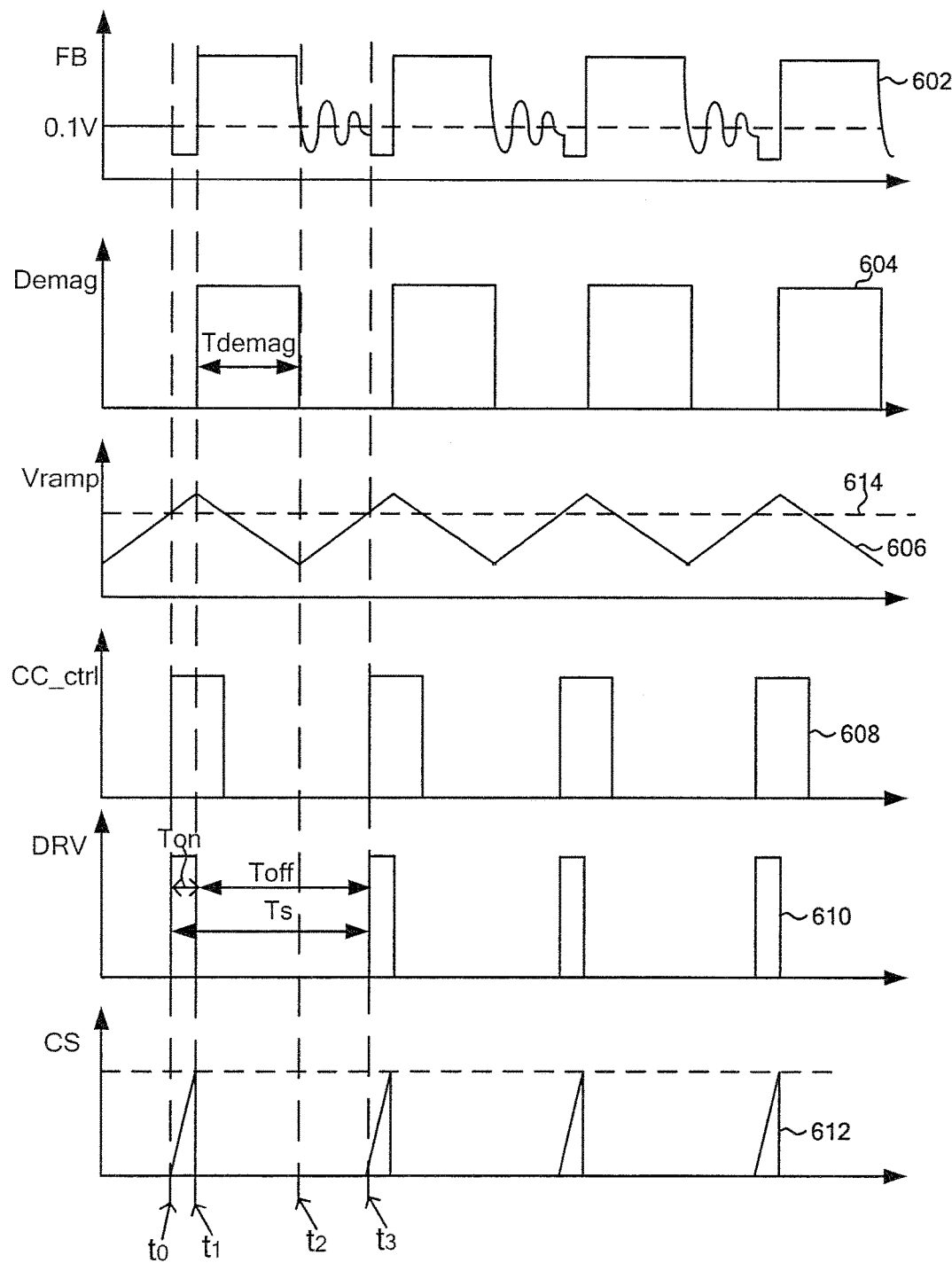
FIG. 6 is a simplified timing diagram for the power conversion system as shown in FIG. 3.

FIG. 6 is a simplified timing diagram for the power conversion system 300. The waveform 602 represents the feedback voltage 354 as a function of time, the waveform 604 represents the detection signal 358 as a function of time, and the waveform 606 represents the signal 420 as a function of time. The waveform 608 represents the signal 346 as a function of time, the waveform 610 represents the signal 348 as a function of time, and the waveform 612 represents the current-sensing signal 342 as a function of time.

Four time periods are shown in FIG. 6. A switching period includes an on-time period $T_{on}$ and an off-time period $T_{off}$ and corresponds to a modulation frequency. The off-time period $T_{off}$ includes a demagnetization period $T_{demag}$. The on-time period starts at time $t_0$ and ends at time $t_1$, the demagnetization period starts at the time $t_1$ and ends at time $t_2$, and the off-time period starts at the time $t_1$ and ends at time $t_3$. For example, $t_0 \leq t_1 \leq t_2 \leq t_3$.

For example, at the beginning of the on-time period $T_{on}$ (e.g., at $t_0$), the signal 348 changes from a logic low level to a logic high level (e.g., as shown by the waveform 610), and in response the switch 320 is closed (e.g., being turned on). In another example, the transformer including the primary winding 310 and the secondary winding 312 stores energy, and the primary current 396 increases in magnitude (e.g., linearly). In yet another example, the current-sensing signal 342 increases in magnitude (e.g., as shown by the waveform 612). As an example, when the current-sensing signal 342 reaches a threshold voltage 332 (e.g., $V_{th\_ocp}$), the comparator 326 changes the comparison signal 334 in order to turn off the switch 320. As another example, during the on-time period, the detection signal 358 (e.g., Demag) keeps at a logic low level (e.g., as shown by the waveform 604). As yet another example, the switch 408 is open (e.g., being turned off) and the switch 416 is closed (e.g., being turned on). As yet another example, the capacitor 414 is charged (e.g., at $I_0$), and the signal 420 increases in magnitude (e.g., linearly) as shown by the waveform 606.

In one example, at the beginning of the demagnetization period $T_{demag}$ (e.g., at $t_1$), the signal 348 changes from the logic high level to the logic low level (e.g., as shown by the waveform 610), and in response the switch 320 is opened (e.g., being turned off). In another example, the energy stored in the transformer is released to the output terminal, and the demagnetization process begins. In yet another example, a secondary current 397 that flows through the secondary winding 312 decreases in magnitude (e.g., linearly). In yet another example, a voltage 395 at the auxiliary winding 314 maps the output voltage 393, and the feedback voltage 354 is generated through the voltage divider including the resistors 350 and 352. As an example, when the secondary current decreases to a low magnitude (e.g., 0), the demagnetization process ends. As another example, the transformer including the primary winding 310 and the secondary winding 312 enters a resonant status. As yet another example, a voltage 395 at the auxiliary winding 314 has an approximate sinusoidal waveform. In an example, during the demagnetization period, the detection signal 358 (e.g., Demag) keeps at a logic high level (e.g., as shown by the waveform 604). In yet another example, the switch 416 is opened (e.g., being turned off) and the switch 408 is closed (e.g., being turned on). In yet another example, the capacitor 414 is discharged (e.g., at $I_1$), and the signal 420 decreases in magnitude (e.g., linearly) as shown by the waveform 606. In yet another example, if the feedback voltage 354 becomes larger than the reference signal 516 (e.g., 0.1 V) in magnitude, it is determined that the demagnetization process has begun. In yet another example, if the feedback voltage 354 becomes smaller than the reference signal 516 (e.g., 0.1 V) in magnitude, it is determined that the demagnetization process has ended.

As one example, after the demagnetization process ends (e.g., at $t_2$), the detection signal 358 changes from the logic high level to the logic low level (e.g., as shown by the waveform 604). As another example, the switch 408 is open (e.g., being turned off) and the switch 416 is closed (e.g., being turned on). As yet another example, the capacitor 414 is charged again, and the signal 420 increases in magnitude (e.g., linearly) again as shown by the waveform 606. As yet another example, when the signal 420 becomes larger than a threshold voltage 614 (e.g., the reference signal 422) in magnitude (e.g., at $t_3$), the comparator 410 changes the signal 346 (e.g., CC_ctrl) from the logic low level to the logic high level (e.g., as shown by the waveform 608). As yet another example, in response to the signal 346 being at the logic high level, the driving component 322 changes the signal 348 from the logic low level to the logic high level (e.g., at $t_3$ as shown by the waveform 610).

For example, the switching period is determined as follows:

$$T_s = \frac{I_0 + I_1}{I_1} T_{demag} = K T_{demag} \quad \text{(Equation 7)}$$

where $I_0$ represents the current 418, and $I_1$ represents the current 424.

The peak value of the primary current 396 is determined as follows:

$$I_p = \frac{V_{thocp}}{R_s} \quad \text{(Equation 8)}$$

where $V_{thocp}$ represents the threshold voltage 332, and $R_s$ represents the resistance of the resistor 330.

Assuming the transmission efficiency of the transformer is 100%, the output current is determined as follows:

$$I_{out} = \frac{\frac{1}{2} N I_p T_{demag}}{T_s} \quad \text{(Equation 9)}$$

where N represents a turns ratio between the primary winding 310 and the secondary winding 312.

According to Equations 7-9, the output current is determined as follows:

$$I_{out} = \frac{1}{2} N \frac{V_{thocp}}{K R_s} \quad \text{(Equation 10)}$$

where K is larger than 1. According to Equation 10, the output current may be regulated to be approximately constant, in some embodiments.

The operating frequency in the constant-current mode can be determined as follows:

$$F_{cc} = \frac{1}{K T_{demag}} \quad \text{(Equation 11)}$$

where $F_{cc}$ represents the operating frequency in the constant-current mode.

The duration of the demagnetization period can be determined as follows:

$$T_{demag} = \frac{N^2 L_m I_p}{V_{out} + V_d} = \frac{N^2 L_m}{V_{out} + V_d} \frac{V_{thocp}}{R_s} \quad \text{(Equation 12)}$$

where $L_m$ represents the inductance of the primary winding 310, and $V_d$ represents a forward voltage drop of the diode 360.

According to Equations 11-12, the operating frequency in the constant-current mode can be determined as follows:

$$F_{cc} = \frac{(V_{out} + V_d) R_s}{K N^2 L_m V_{thocp}} \quad \text{(Equation 13)}$$

Figure 7:
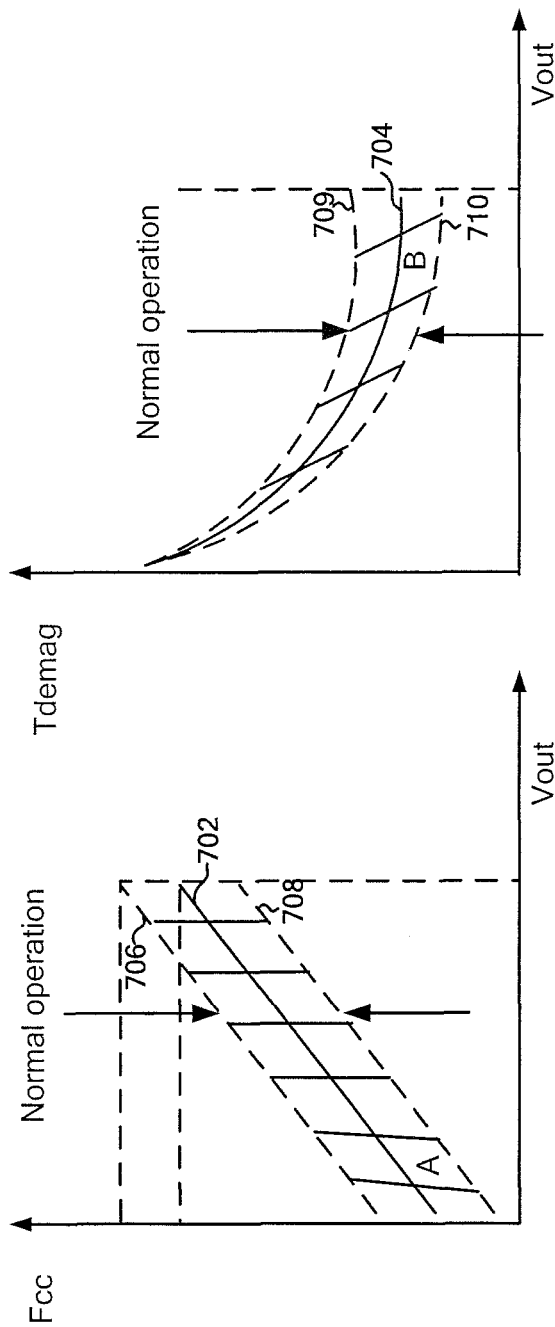
FIG. 7A is a simplified diagram showing a relationship between the operating frequency and the output voltage of the power conversion system as shown in FIG. 3 in the constant-current mode under normal operations.
FIG. 7B is a simplified diagram showing a relationship between the duration of the demagnetization period and the output voltage of the power conversion system as shown in FIG. 3 in the constant-current mode under normal operations.

FIG. 7A is a simplified diagram showing a relationship between the operating frequency and the output voltage 393 of the power conversion system 300 in the constant-current mode under normal operations, and FIG. 7B is a simplified diagram showing a relationship between the duration of the demagnetization period and the output voltage 393 of the power conversion system 300 in the constant-current mode under normal operations.

For example, if the threshold voltage 332 is approximately constant, the operating frequency (e.g., $F_{cc}$) in the constant-current mode is proportional to the output voltage 393 (e.g., as shown by a waveform 702 in FIG. 7A), and the duration of the demagnetization period in the constant-current mode is inversely proportional to the output voltage 393 (e.g., as shown by a waveform 704 in FIG. 7B). In another example, the shaded area A between dashed lines 706 and 708 in FIG. 7A indicates the variation of the operating frequency in normal operations considering the inductance of the transformer including the primary winding 310 varies. In yet another example, the shaded area B between dashed lines 709 and 710 in FIG. 7B indicates the variation of the duration of the demagnetization period in normal operations considering the inductance of the transformer including the primary winding 310 varies.

As shown in FIG. 7B, the duration of the demagnetization period with respect to the output voltage 393 changes in a small area (e.g., the shaded area B) under normal operations, in some embodiments. For example, when the duration of the demagnetization period goes beyond the shaded area B, the power conversion system 300 may be deemed as not under normal operations. Hence, in another example, the power conversion system 300 needs to be protected against certain abnormal operations.

Figure 8:
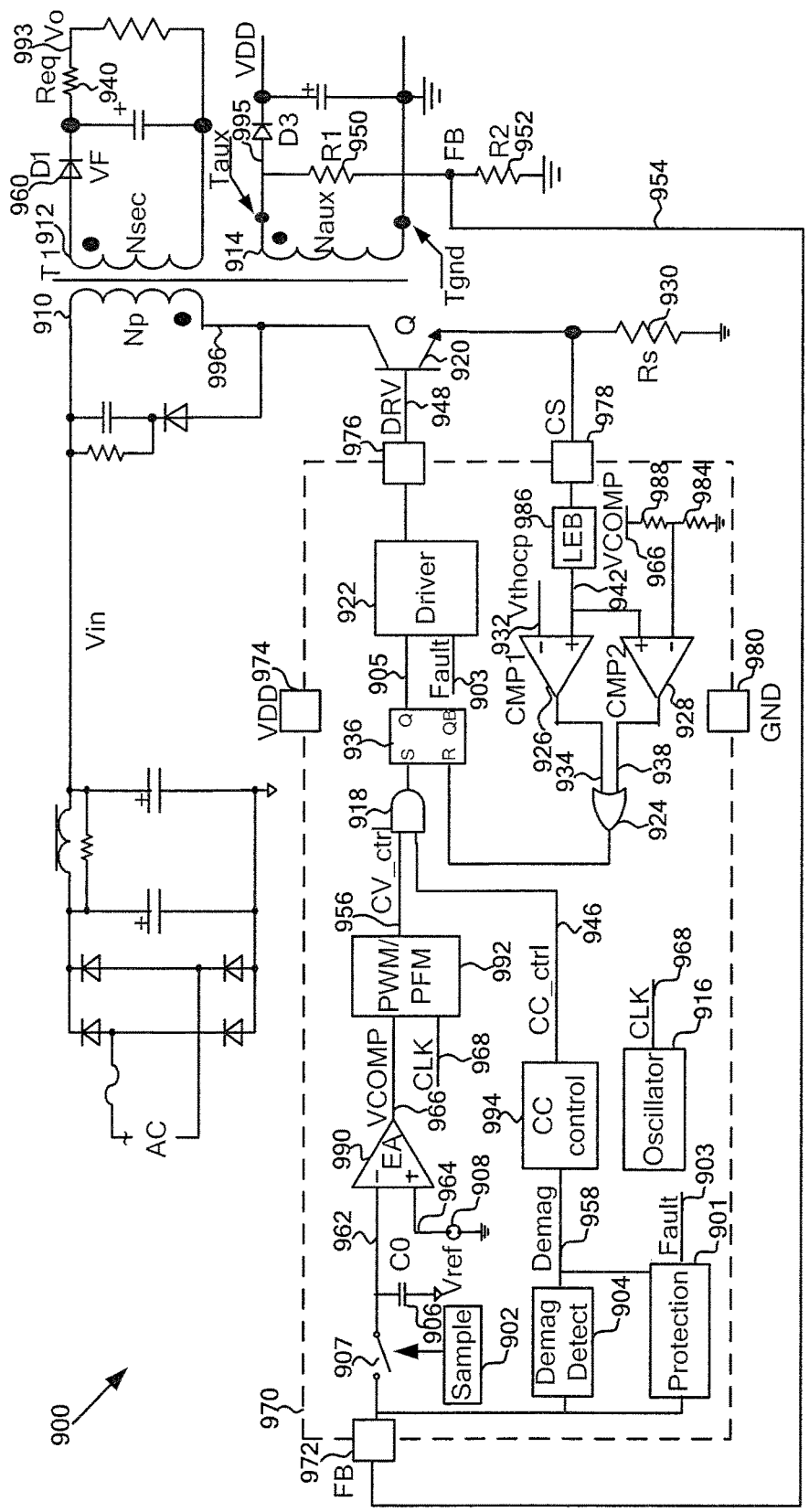
FIG. 8 is a simplified diagram showing a power conversion system with primary-side sensing and regulation according to an embodiment of the present invention.

FIG. 8 is a simplified diagram showing a power conversion system with primary-side sensing and regulation according to an embodiment of the present invention. This diagram is merely an example, which should not unduly limit the scope of the claims. One of ordinary skill in the art would recognize many variations, alternatives, and modifications. The power conversion system 900 includes a primary winding 910, a secondary winding 912, an auxiliary winding 914, a power switch 920, a current sensing resistor 930, an equivalent resistor 940 for an output cable, resistors 950 and 952, a rectifying diode 960, and a controller 970. The controller 970 includes a protection component 901, a sampling component 902, a demagnetization detector 904, a capacitor 906, a switch 907, a reference-signal generator 908, an oscillator 916, an AND gate 918, a driving component 922, an OR gate 924, comparators 926 and 928, a flip-flop component 936, a leading edge blanking (LEB) component 986, resistors 984 and 988, an error amplifier 990, a modulation component 992, and a constant-current (CC) component 994. For example, the power switch 920 is a bipolar transistor. In another example, the power switch 920 is a MOS transistor. In yet another example, the controller 970 includes terminals 972, 974, 976, 978 and 980.

According to one embodiment, the auxiliary winding 914 is magnetically coupled to the secondary winding 912, which, with one or more other components, generates an output voltage 993. For example, information related to the output voltage is processed by a voltage divider of the resistors 950 and 952, and is used to generate a feedback voltage 954, which is received by the terminal 972 (e.g., terminal FB) of the controller 970. In another example, the sampling component 902 samples the feedback voltage 954 and the sampled signal is held at the capacitor 906. In yet another example, the sampling component 902 samples the feedback voltage 954 at the middle point of the demagnetization period.

According to another embodiment, the error amplifier 990 compares the sampled-and-held voltage 962 with a reference signal 964 generated by the reference-signal generator 908, and outputs a comparison signal 966 associated with the error of the sampled-and-held voltage 962 with respect to the reference signal 964. For example, the comparison signal 966 is received by the modulation component 992 which receives a clock signal 968 from the oscillator 916 and outputs a modulation signal 956 (e.g., CV_ctrl). In another example, the comparison signal 966 is used to control the pulse width for pulse-width modulation (PWM) and/or the switching frequency for pulse-frequency modulation (PFM) in order to regulate the output voltage in the constant voltage mode. In yet another example, when the sampled-and-held voltage 962 is smaller than the reference signal 964 in magnitude, the error amplifier 990 outputs the comparison signal 966 at a logic high level in order to operate the power conversion system 900 operates in the constant-current mode. In yet another example, the demagnetization detector 904 determines the duration of a demagnetization period based on the feedback voltage 954 and outputs a detection signal 958 to the constant-current component 994 which generates a signal 946 (e.g., CC_ctrl). In yet another example, both the modulation signal 956 and the signal 946 are received by the AND gate 918 to affect the flip-flop component 936.

According to yet another embodiment, the driving component 922 outputs a driving signal 948 through the terminal 976 to affect the status of the switch 920. For example, a primary current 996 flowing through the primary winding 910 is sensed using the resistor 930, and a current-sensing signal 942 is generated through the LEB component 986 and received by the comparators 926 and 928. In another example, the comparator 926 and the comparator 928 output comparison signals 934 and 938 respectively, to the OR gate 924 to affect the flip-flop component 936. In yet another example, the protection component 901 receives the feedback voltage 954 and outputs a signal 903 (e.g., fault) to the flip-flop component 936. In yet another example, the driving component 922 receives a signal 905 from the flip-flop component and the signal 903 and outputs a driving signal 948 to affect the switch 920.

Figure 9:
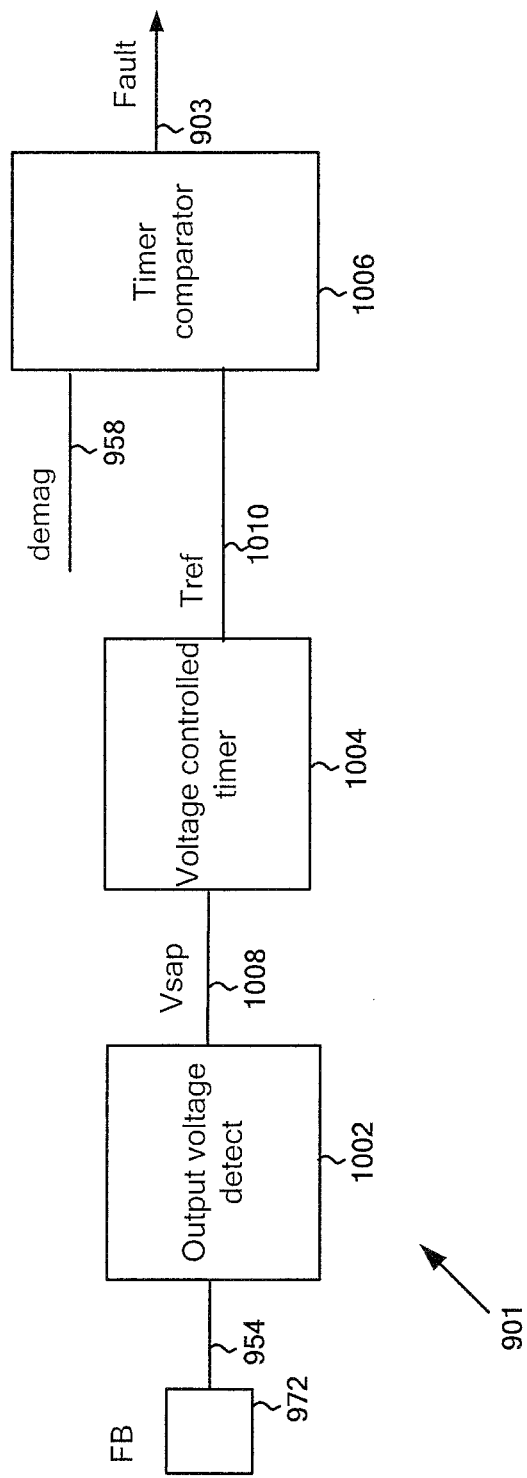
FIG. 9 is a simplified diagram showing certain components of the protection component as part of the power conversion system as shown in FIG. 8 according to an embodiment of the present invention.

FIG. 9 is a simplified diagram showing certain components of the protection component 901 as part of the power conversion system 900 according to an embodiment of the present invention. This diagram is merely an example, which should not unduly limit the scope of the claims. One of ordinary skill in the art would recognize many variations, alternatives, and modifications. The protection component 901 includes an output-voltage detector 1002, a voltage-controlled-timer component 1004, and a timer comparator 1006.

According to one embodiment, the output-voltage detector 1002 receives the feedback voltage 954 and outputs a signal 1008 (e.g., $V_{sap}$). For example, the signal 1008 (e.g., $V_{sap}$) is associated with (e.g., approximately proportional to) the output voltage 993. In another example, the voltage-controlled-timer component 1004 receives the signal 1008 and outputs a signal 1010. In yet another example, the signal 1010 corresponds to a reference duration (e.g., $T_{ref}$) which has a waveform with respect to the output voltage 993. In yet another example, the timer comparator 1006 compares the detection signal 958 which indicates the duration of the demagnetization period of the power conversion system 900 and the signal 1010 and outputs the signal 903 (e.g., fault). In yet another example, if the reference duration (e.g., $T_{ref}$) is smaller than the duration of the demagnetization period of the power conversion system 900, the timer comparator 1006 outputs the signal 903 (e.g., fault) at the logic low level which indicates that the power conversion system 900 is under normal operations. In yet another example, if the reference duration (e.g., $T_{ref}$) is larger than the duration of the demagnetization period of the power conversion system 900, the timer comparator 1006 outputs the signal 903 (e.g., fault) at the logic high level which indicates that the power conversion system 900 is not under normal operations.

$$V_{sap} = \frac{R_2}{R_1 + R_2}(V_{out} + V_d) \quad \text{(Equation 14)}$$

where $V_{sap}$ represents the signal 1088, $V_d$ represents a forward voltage drop of the diode 960, $R_1$ represents a resistance of the resistor 950, and $R_2$ represents a resistance of the resistor 952. In yet another example, the signal 1088 represents the output voltage 993 under normal operations.

According to another embodiment, the reference duration (e.g., $T_{ref}$) is determined as follows:

$$T_{ref} = \frac{1}{M} \frac{N^2 L_m}{V_{out} + V_d} \frac{V_{thocp}}{R_s} \quad \text{(Equation 15)}$$

where N represents a turns ratio between the primary winding 910 and the secondary winding 912, $V_{thocp}$ represents a threshold voltage 932, and $R_s$ represents the resistance of the resistor 930. In addition, $L_m$ represents the inductance of the primary winding 910, $V_{out}$ represents the output voltage 993, $V_d$ represents a forward voltage drop of the diode 960, and M is a constant (e.g., larger than 1). For example, M is in the range of 1.4~2. In another example, $V_{thocp}$ has a fixed magnitude.

Figure 10:
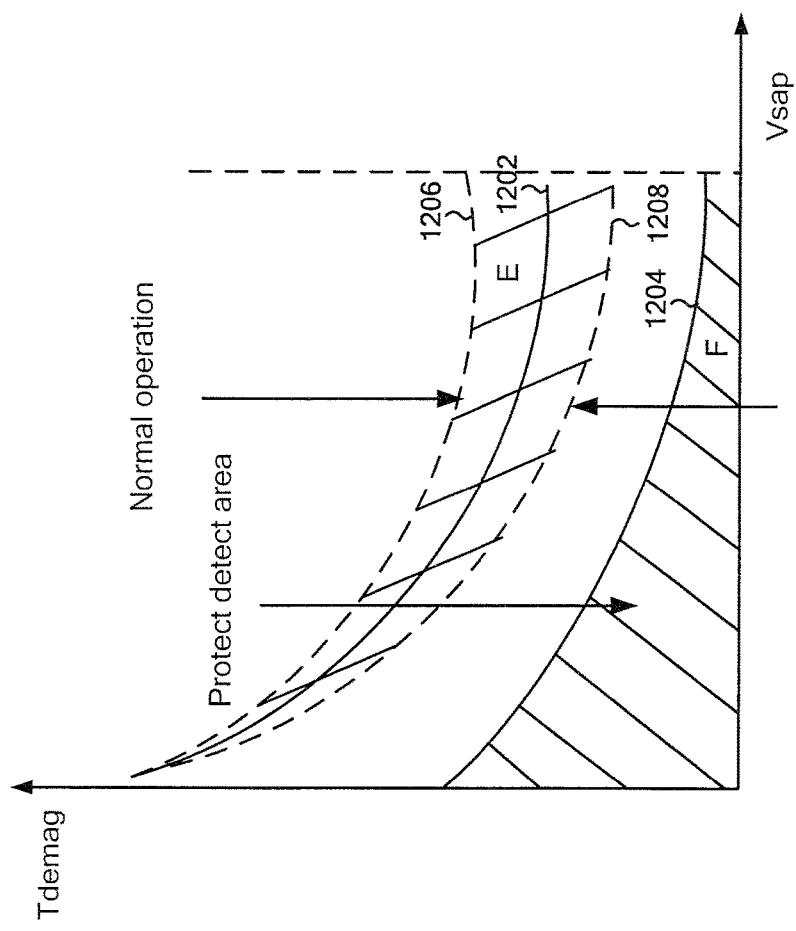
FIG. 10 is a simplified diagram showing a relationship between the duration of the demagnetization period and the signal of the power conversion system as shown in FIG. 8 under normal operations, and under certain abnormal operations against which the power conversion system is protected, according to one embodiment of the present invention.

FIG. 10 is a simplified diagram showing a relationship between the duration of the demagnetization period and the signal 1008 of the power conversion system 900 under normal operations, and under certain abnormal operations against which the power conversion system 900 is protected, according to one embodiment of the present invention. This diagram is merely an example, which should not unduly limit the scope of the claims. One of ordinary skill in the art would recognize many variations, alternatives, and modifications. The waveform 1202 represents a relationship between the duration of the demagnetization period and the signal 1008 (e.g., $V_{sap}$), and the waveform 1204 represents a relationship between the reference duration $T_{ref}$ and the signal 1008 (e.g., $V_{sap}$) of the power conversion system 900. For example, under normal operations, the signal 1008 (e.g., $V_{sap}$) represents the output voltage 993 of the power conversion system 900.

As shown in FIG. 10, the duration of the demagnetization period with respect to the signal 1008 changes in a small area (e.g., the shaded area E between dashed lines 1206 and 1208) under normal operations, in some embodiments. For example, when the duration of the demagnetization period changes in the shaded area E, the signal 948 is output as a modulation signal to turn on and turn off the switch 920 within a switching period. In another example, when the duration of the demagnetization period with respect to the signal 1008 goes into another shaded area F below the waveform 1204, the signal 1008 does not represent the output voltage 993, and the power conversion system 900 is under certain abnormal operations against which the power conversion system 900 is protected. In another example, the switch 920 is opened (e.g., being turned off) to protect the power conversion system 900. In yet another example, the waveform 1204 is parallel to the waveform 1202.

Figure 11:
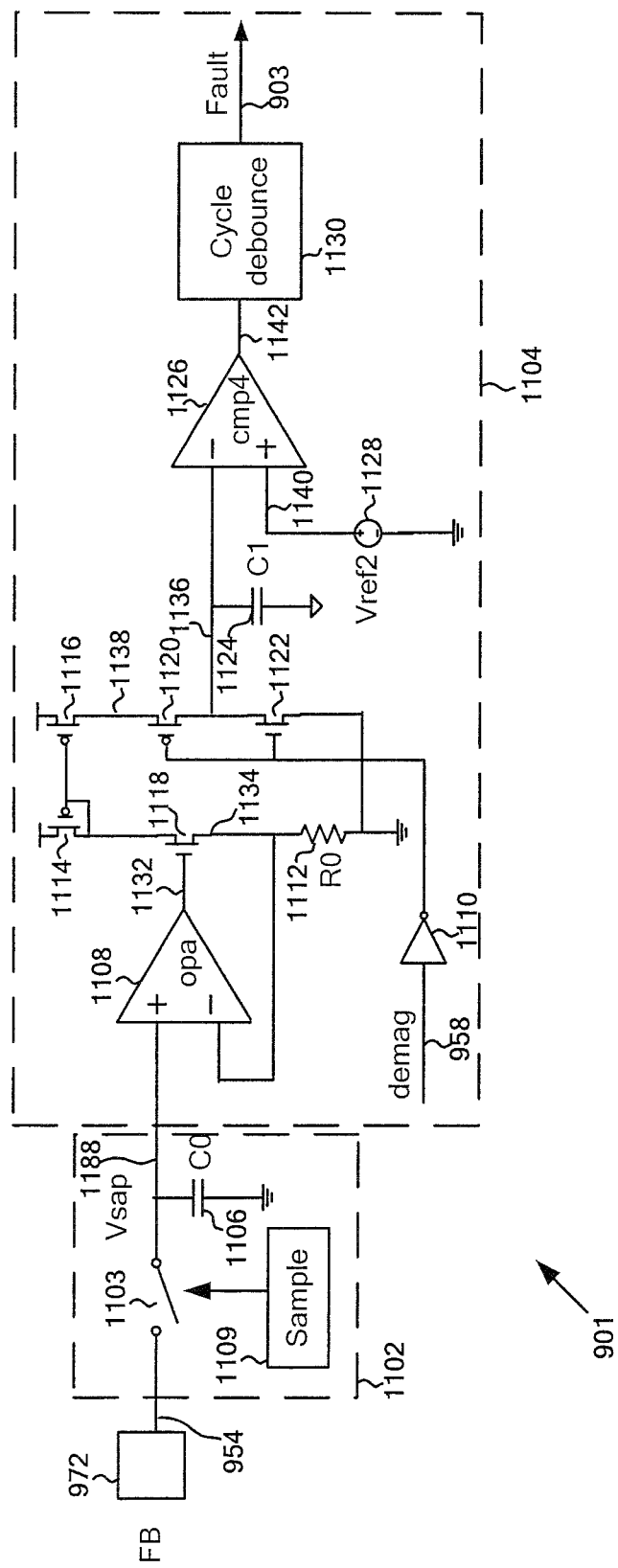
FIG. 11 is a simplified diagram showing certain components of the protection component as part of the power conversion system as shown in FIG. 8 according to another embodiment of the present invention.

FIG. 11 is a simplified diagram showing certain components of the protection component 901 as part of the power conversion system 900 according to another embodiment of the present invention. This diagram is merely an example, which should not unduly limit the scope of the claims. One of ordinary skill in the art would recognize many variations, alternatives, and modifications. The protection component 901 includes an output-voltage detector 1102, and a timer-and-comparator component 1104. The output-voltage detector 1102 includes a switch 1103, a sampling component 1109, and a capacitor 1106. The timer-and-comparator component 1104 includes an amplifier 1108, a NOT gate 1110, transistors 1114, 1116, 1118, 1120, 1122, a resistor 1112, a capacitor 1124, a reference-signal generator 1128, a comparator 1126, and a cycle-debounce component 1130. For example, the output-voltage detector 1102 is the output-voltage detector 1002, the timer-and-comparator component 1104 is a combination of the voltage-controlled-timer component 1004 and the timer comparator 1006, and the signal 1188 is the signal 1008.

According to one embodiment, the sampling component 1109 samples the feedback voltage 954 and the sampled signal is held at the capacitor 1106. For example, the output-voltage detector 1102 outputs a sampled-and-held signal 1188 (e.g., $V_{sap}$) to the timer-and-comparator component 1104. In another example, the sampled-and-held signal 1188 is determined as follows:

$$V_{sap} = \frac{R_2}{R_1 + R_2}(V_{out} + V_d) \quad \text{(Equation 16)}$$

where $V_{sap}$ represents the signal 1188, $V_d$ represents a forward voltage drop of the diode 960, $R_1$ represents a resistance of the resistor 950, and $R_2$ represents a resistance of the resistor 952. In yet another example, the sampling component 1109 samples the feedback voltage 954 at a time that is no earlier than the middle point of the demagnetization period but is no later than a point that is ⅚ of the demagnetization period away from the beginning of the demagnetization period.

According to another embodiment, the amplifier 1108 receives the signal 1188 and outputs a signal 1132 to the transistor 1118 so that a current 1134 flows through the transistor 1114, the transistor 1118 and the resistor 1112. For example, during the demagnetization process, the NOT gate 1110 receives the detection signal 958 at a logic high level. In another example, the transistor 1120 is turned on and the transistor 1122 is turned off. In yet another example, a current 1138 flows through the transistors 1116 and 1120 to charge the capacitor 1124, and a signal 1136 increases in magnitude. In yet another example, the comparator 1126 compares the signal 1136 and a reference signal 1140 from the reference-signal generator 1128 and outputs a comparison signal 1142. If the power conversion system 900 operates under normal operations, the signal 1136 is larger than the reference signal 1140 in magnitude, and the comparator 1126 outputs the comparison signal 1142 at the logic low level, in some embodiments. For example, the signal 903 is at the logic low level. If the power conversion system 900 does not operate under normal operations, the signal 1136 is smaller than the reference signal 1140 in magnitude, and the comparator 1126 outputs the comparison signal 1142 at the logic high level, in some embodiments. For example, the signal 903 is at the logic high level. In another example, in response to the signal 903 being at the logic high level, the switch 920 is opened (e.g., be turned off) for a time period longer than at least a switching period (e.g., without any modulation) to protect the system 900. In yet another example, in response to the signal 903 being at the logic high level, the system 900 is shut down and the switch 920 keeps open. In yet another example, after being shut down, the system 900 restarts (e.g., automatically or manually) and starts modulation again. In yet another example, the switch 920 is closed (e.g., being turned on) and opened (e.g., being turned off) at a modulation frequency again. In certain embodiments, the cycle-debounce component 1130 is omitted, and the signal 903 is the same as the signal 1142.

According to yet another embodiment, a reference duration $T_{ref1}$ corresponds to the reference signal 1140 is determined as follows:

$$T_{ref1} = \frac{R_0 C_1 V_{ref2}}{V_{sap}} = R_0 C_1 \frac{R_1 + R_2}{R_2} \frac{V_{ref2}}{V_{out} + V_d} \quad \text{(Equation 17)}$$

where $R_0$ represents a resistance of the resistor 1112, $C_1$ represents a capacitance of the capacitor 1124, and $V_{ref2}$ represents the reference signal 1140.

In yet another example, according to Equation 15, the reference duration $T_{ref1}$ is set to be equal to $T_{ref}$:

$$T_{ref1} = T_{ref} = \frac{1}{M} \frac{N^2 L_m}{V_{out} + V_d} \frac{V_{thocp}}{R_s} \quad \text{(Equation 18)}$$

According to Equations 17-18, the constant M is determined as follows, in some embodiments:

$$M = \frac{N^2 L_m V_{thocp}}{R_s V_{ref2}} \frac{R_2}{(R_1 + R_2)} \frac{1}{R_0 C_1} \quad \text{(Equation 19)}$$

For example, if N, $L_m$, $V_{thocp}$, $V_{ref2}$, $R_s$, $R_1$, $R_2$, $R_0$, and $C_1$ are chosen properly, the constant M is larger than 1 so that the reference duration $T_{ref1}$ has a waveform with respect to the output voltage 993 similar to the waveform 1204 as shown in FIG. 10.

As discussed above and further emphasized here, FIGS. 8, 9 and 11 are merely examples, which should not unduly limit the scope of the claims. One of ordinary skill in the art would recognize many variations, alternatives, and modifications. In one embodiment, the protection component 901 receives the sampled-and-held voltage 962 instead of the feedback voltage 954, and the protection component 901 does not include the output-voltage detector 1002 or the output-voltage detector 1102. For example, the switch 1103 is the switch 907, the capacitor 1106 is the capacitor 906, and the sampling component 1109 is the sampling component 902. In another example, the sampling component 902 samples the feedback voltage 954 at the middle point of the demagnetization period. In another embodiment, the threshold voltage 932 does not have a fixed magnitude, as shown in FIG. 12 and FIG. 13.

As discussed above and further emphasized here, FIG. 10 is merely an example, which should not unduly limit the scope of the claims. One of ordinary skill in the art would recognize many variations, alternatives, and modifications. For example, the waveform 1202 and the waveform 1204 are affected by the current-sensing signal 996. Therefore, the protection component receives the current-sensing signal as an input, as shown in FIG. 12.

Figure 12:
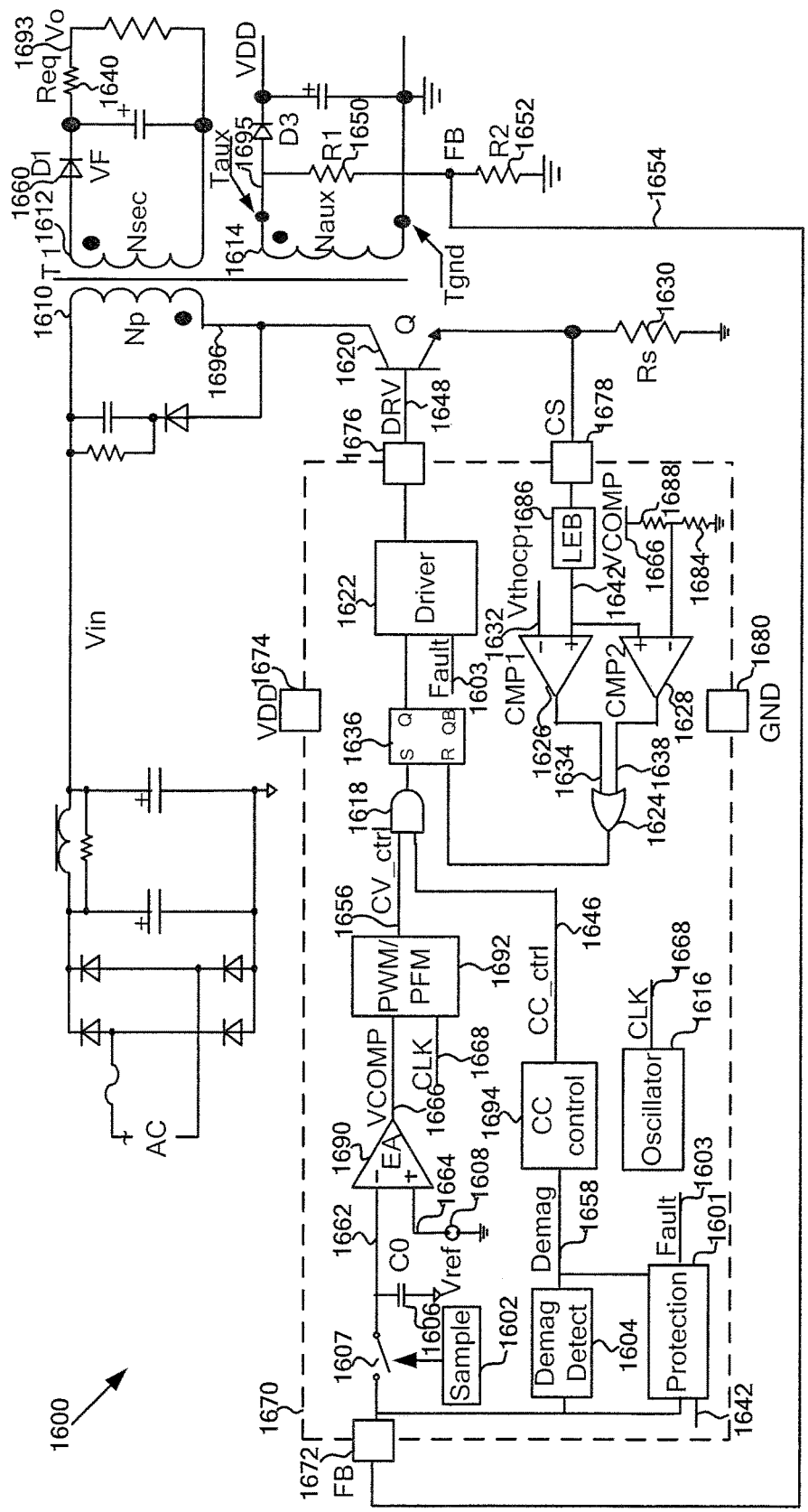
FIG. 12 is a simplified diagram showing a power conversion system with primary-side sensing and regulation according to another embodiment of the present invention.
Figure 13:
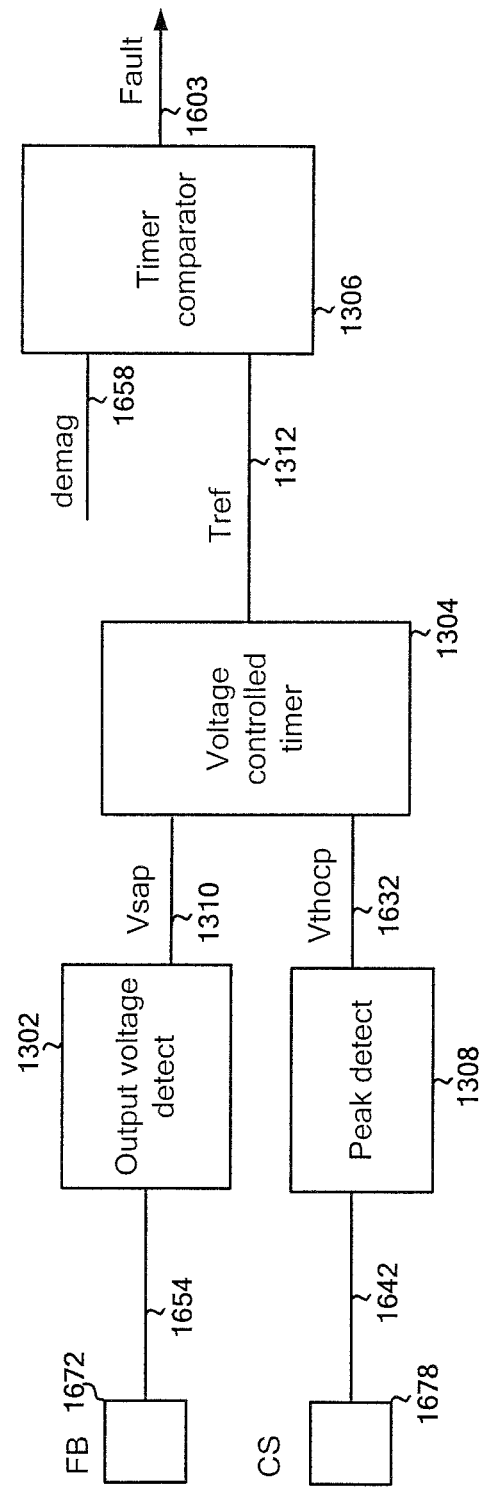
FIG. 13 is a simplified diagram showing certain components of the protection component as part of the power conversion system as shown in FIG. 12 according to one embodiment of the present invention.

FIG. 12 is a simplified diagram showing a power conversion system with primary-side sensing and regulation according to another embodiment of the present invention. This diagram is merely an example, which should not unduly limit the scope of the claims. One of ordinary skill in the art would recognize many variations, alternatives, and modifications. The power conversion system 1600 includes a primary winding 1610, a secondary winding 1612, an auxiliary winding 1614, a power switch 1620, a current sensing resistor 1630, an equivalent resistor 1640 for an output cable, resistors 1650 and 1652, a rectifying diode 1660, and a controller 1670. The controller 1670 includes a protection component 1601, a sampling component 1602, a demagnetization detector 1604, a capacitor 1606, a switch 1607, a reference-signal generator 1608, an oscillator 1616, an AND gate 1618; a driving component 1622, an OR gate 1624, comparators 1626 and 1628, a flip-flop component 1636, a leading edge blanking (LEB) component 1686, resistors 1684 and 1688, an error amplifier 1690, a modulation component 1692, and a constant-current (CC) component 1694. For example, the power switch 1620 is a bipolar transistor. In another example, the power switch 1620 is a MOS transistor. In yet another example, the controller 1670 includes terminals 1672, 1674, 1676, 1678 and 1680.

According to one embodiment, the auxiliary winding 1614 is magnetically coupled to the secondary winding 1612, which, with one or more other components, generates an output voltage 1693. For example, information related to the output voltage is processed by a voltage divider of the resistors 1650 and 1652, and is used to generate a feedback voltage 1654, which is received by the terminal 1672 (e.g., terminal FB) of the controller 1670. In another example, the sampling component 1602 samples the feedback voltage 1654 and the sampled signal is held at the capacitor 1606. In yet another example, the sampling component 1602 samples the feedback voltage 1654 at the middle point of the demagnetization period.

According to another embodiment, the error amplifier 1690 compares the sampled-and-held voltage 1662 with a reference signal 1664 generated by the reference-signal generator 1608, and outputs a comparison signal 1666 associated with the error of the sampled-and-held voltage 1662 with respect to the reference signal 1664. For example, the comparison signal 1666 is received by the modulation component 1692 which receives a clock signal 1668 from the oscillator 1616 and outputs a modulation signal 1656 (e.g., CV_ctrl). In another example, the comparison signal 1666 is used to control the pulse width for pulse-width modulation (PWM) and/or the switching frequency for pulse-frequency modulation (PFM) in order to regulate the output voltage in the constant voltage mode. In yet another example, when the sampled-and-held voltage 1662 is smaller than the reference signal 1664 in magnitude, the error amplifier 1690 outputs the comparison signal 1666 at a logic high level in order to operate the power conversion system 1600 operates in the constant-current mode. In yet another example, the demagnetization detector 1604 determines the duration of a demagnetization period based on the feedback voltage 1654 and outputs a detection signal 1658 to the constant-current component 1694 which generates a signal 1646 (e.g., CC_ctrl). In yet another example, both the modulation signal 1656 and the signal 1646 are received by the AND gate 1618 to affect the flip-flop component 1636.

According to yet another embodiment, the driving component 1622 outputs a driving signal 1648 through the terminal 1676 to affect the status of the switch 1620. For example, a primary current 1696 flowing through the primary winding 1610 is sensed using the resistor 1630, and a current-sensing signal 1642 is generated through the LEB component 1686 and received by the comparators 1626 and 1628. In another example, the comparator 1626 and the comparator 1628 output comparison signals 1634 and 1638 respectively, to the OR gate 1624 to affect the flip-flop component 1636. In yet another example, the protection component 1601 receives the feedback voltage 1654 and the current-sensing signal 1642 and outputs a signal 1603 (e.g., fault) to the flip-flop component 1636. In yet another example, the driving component 1622 receives a signal 1605 from the flip-flop component and the signal 1603 and outputs a driving signal 1648 to affect the switch 1620.

FIG. 13 is a simplified diagram showing certain components of the protection component 1601 as part of the power conversion system 1600 according to an embodiment of the present invention. This diagram is merely an example, which should not unduly limit the scope of the claims. One of ordinary skill in the art would recognize many variations, alternatives, and modifications. The protection component 1601 includes an output-voltage detector 1302, a voltage-controlled-timer component 1304, a timer comparator 1306, and a peak-current detector 1308.

According to one embodiment, the output-voltage detector 1302 receives the feedback voltage 1654 and outputs a signal 1310 (e.g., $V_{sap}$). For example, the signal 1310 (e.g., $V_{sap}$) is associated with (e.g., approximately proportional to) the output voltage 1693. In another example, the peak-current detector 1308 receives the current-sensing signal 1642 and outputs the threshold voltage 1632. In yet another example, the voltage-controlled-timer component 1304 receives the signal 1310 and the threshold voltage 1632 and outputs a signal 1312. In yet another example, the signal 1312 corresponds to a reference duration (e.g., $T_{ref3}$). In yet another example, the timer comparator 1306 compares the detection signal 1658 which indicates the duration of the demagnetization period of the power conversion system 1600 and the signal 1312 and outputs the signal 1603 (e.g., fault). In yet another example, if the reference duration (e.g., $T_{ref3}$) is smaller than the duration of the demagnetization period of the power conversion system 1600, the timer comparator 1306 outputs the signal 1603 (e.g., fault) at the logic low level which indicates that the power conversion system 1600 is under normal operations. In yet another example, if the reference duration (e.g., $T_{ref3}$) is larger than the duration of the demagnetization period of the power conversion system 1600, the timer comparator 1306 outputs the signal 1603 (e.g., fault) at the logic high level which indicates that the power conversion system 1600 is not under normal operations.

According to another embodiment, the reference duration (e.g., $T_{ref3}$) is determined as follows:

$$T_{ref3} = \frac{1}{M} \frac{N^2 L_m}{V_{out} + V_d} \frac{V_{thocp}}{R_s} \qquad \text{(Equation 20)}$$

where N represents a turns ratio between the primary winding 1610 and the secondary winding 1612, $V_{thocp}$ represents a threshold voltage 1632, and $R_s$ represents the resistance of the resistor 1630. In addition, $L_m$ represents the inductance of the primary winding 1610, $V_{out}$ represents the output voltage 1693, $V_d$ represents a forward voltage drop of the diode 1660, and M is a constant (e.g., larger than 1). For example, M is in the range of 1.4~2. In another example, $V_{thocp}$ has a variable magnitude.

Figure 14:
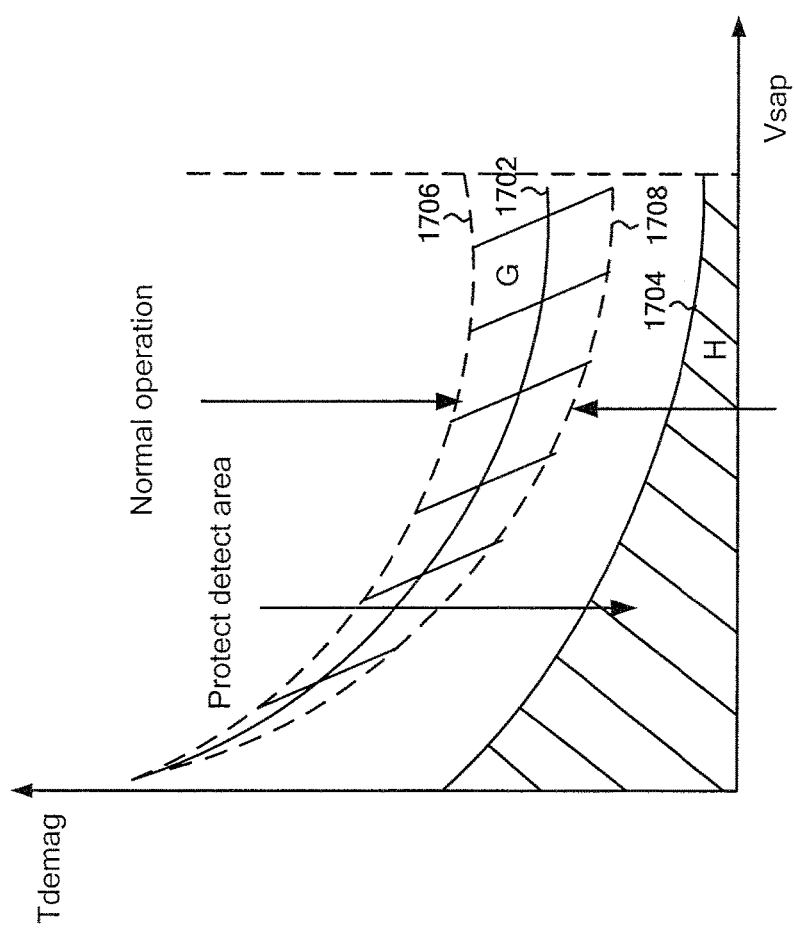
FIG. 14 is a simplified diagram showing a relationship between the duration of the demagnetization period and the signal of the power conversion system as shown in FIG. 12 under normal operations, and under certain abnormal operations against which the power conversion system is protected, according to an embodiment of the present invention.

FIG. 14 is a simplified diagram showing a relationship between the duration of the demagnetization period and the signal 1310 of the power conversion system 1600 under normal operations, and under certain abnormal operations against which the power conversion system 1600 is protected, according to an embodiment of the present invention. This diagram is merely an example, which should not unduly limit the scope of the claims. One of ordinary skill in the art would recognize many variations, alternatives, and modifications. The waveform 1702 represents a relationship between the duration of the demagnetization period and the signal 1310 (e.g., $V_{sap}$), and the waveform 1704 represents a relationship between the reference duration $T_{ref3}$ and the signal 1310 of the power conversion system 1600. For example, under normal operations, the signal 1310 (e.g., $V_{sap}$) represents the output voltage 1693 of the power conversion system 1600.

As shown in FIG. 14, the duration of the demagnetization period with respect to the signal 1310 changes in a small area (e.g., the shaded area G between dashed lines 1706 and 1708) under normal operations, in some embodiments. For example, when the duration of the demagnetization period changes in the shaded area G, the signal 1648 is output as a modulation signal to turn on and turn off the switch 1620 within a switching period. In another example, when the duration of the demagnetization period with respect to the signal 1310 goes into another shaded area H below the waveform 1704, the signal 1310 does not represent the output voltage 1693, and the power conversion system 1600 is under certain abnormal operations against which the power conversion system 1600 is protected. In another example, the switch 1620 is opened (e.g., being turned off) to protect the power conversion system 1600. In yet another example, the waveform 1704 is parallel to the waveform 1702. In yet another example, the waveforms 1702 and 1704 both change with the threshold voltage 1632.

Figure 15:
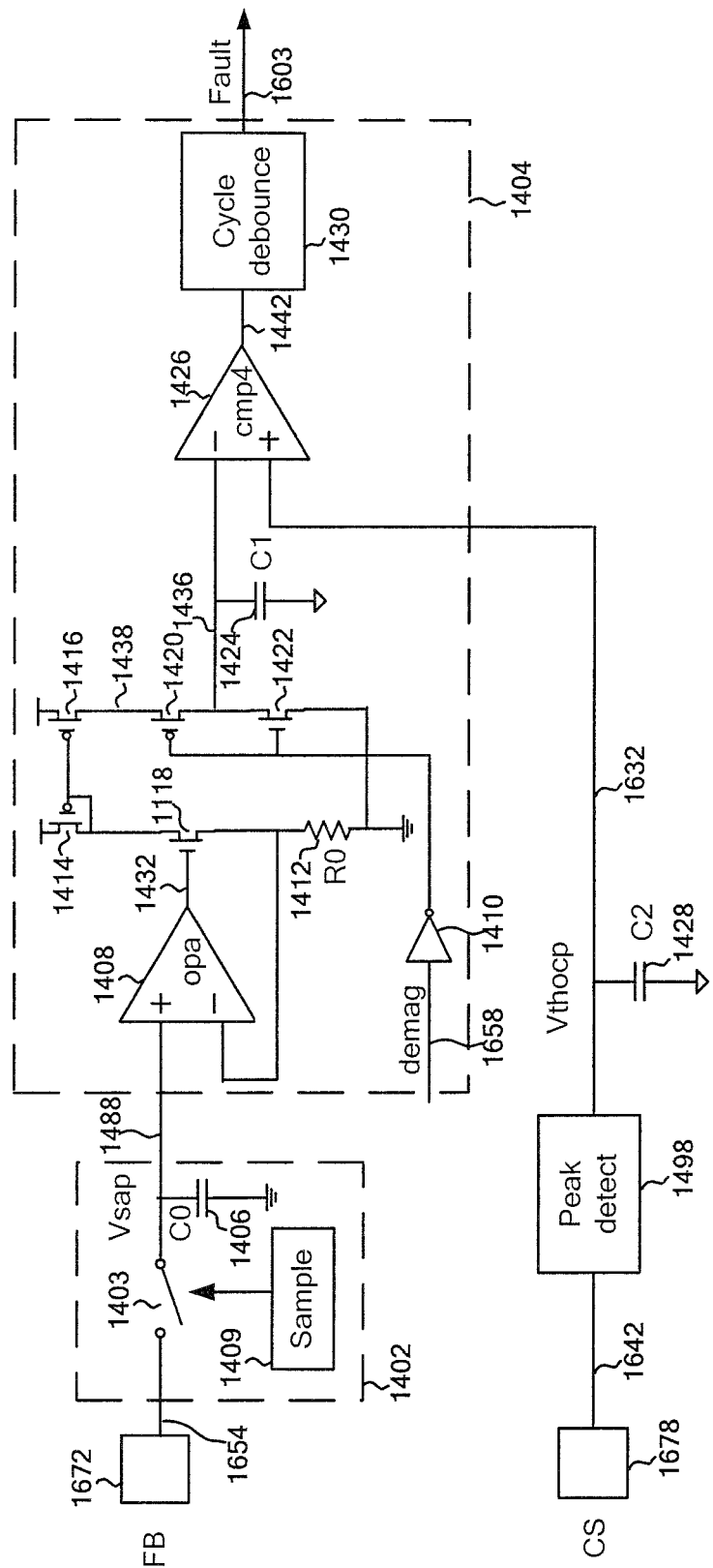
FIG. 15 is a simplified diagram showing certain components of the protection component as part of the power conversion system as shown in FIG. 12 according to another embodiment of the present invention.

FIG. 15 is a simplified diagram showing certain components of the protection component 1601 as part of the power conversion system 1600 according to another embodiment of the present invention. This diagram is merely an example, which should not unduly limit the scope of the claims. One of ordinary skill in the art would recognize many variations, alternatives, and modifications. The protection component 1601 includes an output-voltage detector 1402, a timer-and-comparator component 1404, and a peak-current detector 1498. The output-voltage detector 1402 includes a switch 1403, a sampling component 1409, and a capacitor 1406. The timer-and-comparator component 1404 includes an amplifier 1408, a NOT gate 1410, transistors 1414, 1416, 1418, 1420, 1422, a resistor 1412, a capacitor 1424, a comparator 1426, and a cycle-debounce component 1430. For example, the output-voltage detector 1402 is the output-voltage detector 1302, the peak-current detector 1498 is the peak-current detector 1308, the timer-and-comparator component 1404 is a combination of the voltage-controlled-timer component 1304 and the timer comparator 1306, and the signal 1488 is the signal 1310. In another example, the switch 1403, the sampling component 1409 and the capacitor 1406 are the same as the switch 1607, the sampling component 1602, and the capacitor 1606, respectively. In yet another example, a capacitor 1428 is included in the peak-current detector 1498. In yet another example, the capacitor 1428 is included in the timer-and-comparator component 1404.

According to one embodiment, the sampling component 1409 samples the feedback voltage 1654 and the sampled signal is held at the capacitor 1406. For example, the output-voltage detector 1402 outputs a sampled-and-held signal 1488 (e.g., $V_{sap}$) to the timer-and-comparator component 1404. In another example, the sampled-and-held signal 1488 is determined as follows:

$$V_{sap} = \frac{R_2}{R_1 + R_2}(V_{out} + V_d) \qquad \text{(Equation 21)}$$

where $V_{sap}$ represents the signal 1488, $V_d$ represents a forward voltage drop of the diode 1660, $R_1$ represents a resistance of the resistor 1650, and $R_2$ represents a resistance of the resistor 1652. In yet another example, the sampling component 1409 samples the feedback voltage 1654 at a time that is no earlier than the middle point of the demagnetization period but is no later than a point that is ⅚ of the demagnetization period away from the beginning of the demagnetization period.

According to another embodiment, the amplifier 1408 receives the signal 1488 and outputs a signal 1432 to the transistor 1418 so that a current 1434 flows through the transistor 1414, the transistor 1418 and the resistor 1412. For example, during the demagnetization process, the NOT gate 1410 receives the detection signal 1658 at a logic high level. In another example, the transistor 1420 is turned on and the transistor 1422 is turned off. In yet another example, a current 1438 flows through the transistors 1416 and 1420 to charge the capacitor 1424, and a signal 1436 increases in magnitude. In yet another example, the peak-current detector 1498 receives the current-sensing signal 1642 and outputs the threshold voltage 1632. In yet another example, the comparator 1426 compares the signal 1436 and the threshold voltage 1632 and outputs a comparison signal 1442. If the power conversion system 1600 operates under normal operations, the signal 1436 is larger than the threshold voltage 1632 in magnitude, and the comparator 1426 outputs the comparison signal 1442 at the logic low level, in some embodiments. For example, the signal 1603 is at the logic low level. If the power conversion system 1600 does not operate under normal operations, the signal 1436 is smaller than the threshold voltage 1632 in magnitude, and the comparator 1426 outputs the comparison signal 1442 at the logic high level, in some embodiments. For example, the signal 1603 is at the logic high level. In another example, in response to the signal 1603 being at the logic high level, the switch 1620 is opened (e.g., be turned off) for a time period longer than at least a switching period (e.g., without any modulation) to protect the system 1600. In yet another example, in response to the signal 1603 being at the logic high level, the system 1600 is shut down and, the switch 1620 keeps open. In yet another example, after being shut down, the system 1600 restarts (e.g., automatically or manually) and starts modulation again. In yet another example, the switch 1620 is closed (e.g., being turned on) and opened (e.g., being turned off) at a modulation frequency again. In certain embodiments, the cycle-debounce component 1430 is omitted, and the signal 1603 is the same as the signal 1442.

According to yet another embodiment, a reference duration $T_{ref4}$ corresponds to the threshold voltage 1632 is determined as follows:

$$T_{ref4} = \frac{R_0 C_1 V_{thocp}}{V_{sap}} = R_0 C_1 \frac{R_1 + R_2}{R_2} \frac{V_{thocp}}{V_{out} + V_d} \quad \text{(Equation 22)}$$

where $R_0$ represents a resistance of the resistor 1412, and $C_1$ represents a capacitance of the capacitor 1424.

In yet another example, according to Equation 20, the reference duration $T_{ref4}$ is set to be equal to $T_{ref3}$:

$$T_{ref4} = T_{ref3} = \frac{1}{M} \frac{N^2 L_m}{V_{out} + V_d} \frac{V_{thocp}}{R_s} \quad \text{(Equation 23)}$$

According to Equations 22-23, the constant M is determined as follows, in some embodiments:

$$M = \frac{N^2 L_m}{R_s} \frac{R_2}{(R_1 + R_2)} \frac{1}{R_0 C_1} \quad \text{(Equation 24)}$$

For example, if N, $L_m$, $R_s$, $R_1$, $R_2$, $R_0$, and $C_1$ are chosen properly, the constant M is larger than 1 so that the reference duration $T_{ref4}$ has a waveform with respect to the output voltage 1693 similar to the waveform 1704 as shown in FIG. 14.

Referring back to FIG. 8, in some embodiments, if the resistor 950 is open-circuited or if the resistor 952 is short-circuited, the demagnetization detector 904 cannot detect the duration of the demagnetization period and the feedback voltage 954 has a low magnitude (e.g., 0). For example, as shown in FIG. 11, the capacitor 1124 is not charged and the comparator 1126 outputs the comparison signal 1142 at the logic high level. In another example, the signal 903 is at the logic high level, and the switch 920 is opened (e.g., being turned off) to protect the power conversion system 900.

Referring back to FIG. 12, in certain embodiments, if the resistor 1650 is open-circuited or if the resistor 1652 is short-circuited, the demagnetization detector 1604 cannot detect the duration of the demagnetization period and the feedback voltage 1654 has a low magnitude (e.g., 0). For example, as shown in FIG. 15, the capacitor 1424 is not charged and the comparator 1426 outputs the comparison signal 1442 at the logic high level. In another example, the signal 1603 is at the logic high level, and the switch 1620 is opened (e.g., being turned off) to protect the power conversion system 1600.

As discussed above and further emphasized here, FIGS. 12, 13 and 15 are merely examples, which should not unduly limit the scope of the claims. One of ordinary skill in the art would recognize many variations, alternatives, and modifications. For example, the protection component 1601 receives the sampled-and-held voltage 1662 instead of the feedback voltage 1654, and the protection component 1601 does not include the output-voltage detector 1302 or the output-voltage detector 1402. For example, the switch 1403 is the switch 1607, the capacitor 1406 is the capacitor 1606, and the sampling component 1409 is the sampling component 1602. In another example, the sampling component 1602 samples the feedback voltage 1654 at the middle point of the demagnetization period.

Figure 16:
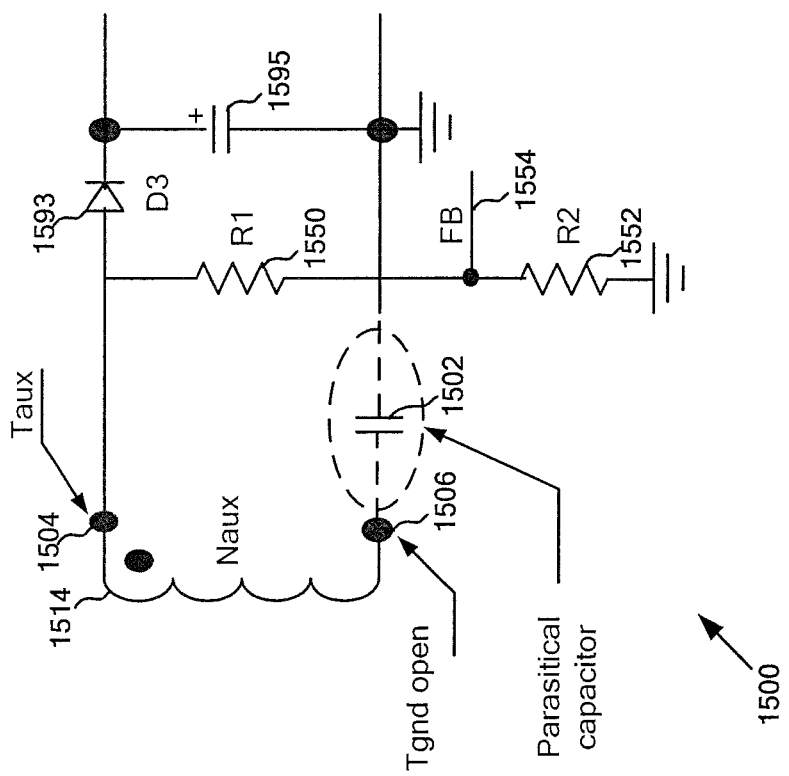
FIG. 16 is a simplified diagram showing certain protection process implemented by the power conversion system as shown in FIG. 8 and/or the power conversion system as shown in FIG. 12 according to certain embodiments of the present invention.

FIG. 16 is a simplified diagram showing certain protection process implemented by the power conversion system 900 and/or the power conversion system 1600 according to certain embodiments of the present invention. This diagram is merely an example, which should not unduly limit the scope of the claims. One of ordinary skill in the art would recognize many variations, alternatives, and modifications. As shown in FIG. 16, a power conversion system 1500 includes an auxiliary winding 1514, resistors 1550 and 1552, a capacitor 1595, and a diode 1593.

In one embodiment, the system 1500 is the same as the system 900. For example, the auxiliary winding 1514 is the same as the auxiliary winding 914, and the resistors 1550 and 1552 are the same as the resistors 950 and 952 respectively. In some embodiments, if a terminal 1504 (e.g., $T_{aux}$) of the auxiliary winding 1514 is open-circuited, the demagnetization detector 1504 cannot detect the duration of the demagnetization period and a feedback voltage 1554 (e.g., the feedback voltage 954) has a low magnitude (e.g., 0). For example, as shown in FIG. 11, the capacitor 1124 is not charged and the comparator 1126 outputs the comparison signal 1142 at the logic high level. In another example, the signal 903 is at the logic high level, and the switch 920 is opened (e.g., being turned off) to protect the power conversion system 900. In certain embodiments, if a terminal 1506 ($T_{ground}$) of the auxiliary winding 1514 is open-circuited, a parasitic capacitor 1502 exists. For example, as shown in FIG. 8, the duration of the demagnetization period detected by the demagnetization detector 904 is close to the actual duration of the demagnetization period. In another example, as shown in FIG. 11, the sampled-and-held signal 1188 related to the feedback voltage 954 has a smaller magnitude than the magnitude under normal operations, the signal 1136 is smaller than the reference signal 1140 in magnitude, and the comparator 1126 outputs the comparison signal 1142 at the logic high level. In yet another example, the signal 903 is at the logic high level, and the switch 920 is opened (e.g., being turned off) to protect the power conversion system 900.

In another embodiment, the system 1500 is the system 1600. For example, the auxiliary winding 1514 is the same as the auxiliary winding 1614, and the resistors 1550 and 1552 are the same as the resistors 1650 and 1652 respectively. In some embodiments, if a terminal 1504 (e.g., $T_{aux}$) of the auxiliary winding 1514 is open-circuited, the demagnetization detector 1504 cannot detect the duration of the demagnetization period and a feedback voltage 1554 (e.g., the feedback voltage 1654) has a low magnitude (e.g., 0). For example, as shown in FIG. 15, the capacitor 1424 is not charged and the comparator 1426 outputs the comparison signal 1442 at the logic high level. In another example, the signal 1603 is at the logic high level, and the switch 1620 is opened (e.g., being turned off) to protect the power conversion system 1600. In certain embodiments, if a terminal 1506 ($T_{ground}$) of the auxiliary winding 1514 is open-circuited, a parasitic capacitor 1502 exists. For example, as shown in FIG. 12, the duration of the demagnetization period detected by the demagnetization detector 1604 is close to the actual duration of the demagnetization period. In another example, as shown in FIG. 14, the sampled-and-held signal 1488 related to the feedback voltage 1654 has a smaller magnitude than the magnitude under normal operations, the signal 1436 is smaller than the threshold voltage 1632 in magnitude, and the comparator 1426 outputs the comparison signal 1442 at the logic high level. In yet another example, the signal 1603 is at the logic high level, and the switch 1620 is opened (e.g., being turned off) to protect the power conversion system 1600.

According to another embodiment, a system controller for protecting a power conversion system includes a protection component and a driving component. The protection component is configured to receive a demagnetization signal generated based on at least information associated with a feedback signal of the power conversion system, process information associated with the demagnetization signal and a detected voltage generated based on at least information associated with the feedback signal, and generate a protection signal based on at least information associated with the detected voltage and the demagnetization signal. The driving component is configured to receive the protection signal and output a driving signal to a switch configured to affect a primary current flowing through a primary winding of the power conversion system. The detected voltage is related to an output voltage of the power conversion system. The demagnetization signal is related to a demagnetization period of the power conversion system. The protection component and the driving component are further configured to, if the detected voltage and the demagnetization signal satisfy one or more conditions, output the driving signal to cause the switch to open and remain open in order to protect the power conversion system. For example, the system controller is implemented according to at least FIG. 8, FIG. 9, FIG. 10, and/or FIG. 11.

According to yet another embodiment, a system controller for protecting a power conversion system includes a protection component and a driving component. The protection component is configured to receive a demagnetization signal generated based on at least information associated with a feedback signal of the power conversion system, receive a current-sensing signal associated with a primary current flowing through a primary winding of the power conversion system, process information associated with the demagnetization signal, the current-sensing signal, and a detected voltage generated based on at least information associated with the feedback signal, and generate a protection signal based on at least information associated with the detected voltage, the demagnetization signal, and the current-sensing signal. The driving component is configured to receive the protection signal and output a driving signal to a switch configured to affect the primary current flowing through the primary winding. The detected voltage is related to an output voltage of the power conversion system. The demagnetization signal is related to a demagnetization period of the power conversion system. The protection component and the driving component are further configured to, if the detected voltage, the demagnetization signal and the current-sensing signal satisfy one or more conditions, output the driving signal to cause the switch to open and remain open in order to protect the power conversion system. For example, the system controller is implemented according to at least FIG. 12, FIG. 13, FIG. 14, and/or FIG. 15.

In one embodiment, a method for protecting a power conversion system includes, receiving a demagnetization signal generated based on at least information associated with a feedback signal of the power conversion system, processing information associated with the demagnetization signal and a detected voltage generated based on at least information associated with the feedback signal, and generating a protection signal based on at least information associated with the detected voltage and the demagnetization signal. The method further includes, receiving the protection signal, generating a driving signal based on at least information associated with the protection signal, and outputting the driving signal to a switch configured to affect a primary current flowing through a primary winding of the power conversion system. The detected voltage is related to an output voltage of the power conversion system. The demagnetization signal is related to a demagnetization period of the power conversion system. The process for outputting a driving signal to a switch configured to affect a primary current flowing through a primary winding of the power conversion system includes, if the detected voltage and the demagnetization signal satisfy one or more conditions, outputting the driving signal to cause the switch to open and remain open in order to protect the power conversion system. For example, the method is implemented according to at least FIG. 8, FIG. 9, FIG. 10, and/or FIG. 11.

In another embodiment, a method for protecting a power conversion system includes, receiving a demagnetization signal generated based on at least information associated with a feedback signal of the power conversion system, receiving a current-sensing signal associated with a primary current flowing through a primary winding of the power conversion system, and processing information associated with the demagnetization signal, the current-sensing signal, and a detected voltage generated based on at least information associated with the feedback signal. The method further includes, generating a protection signal based on at least information associated with the detected voltage, the demagnetization signal, and the current-sensing signal, receiving the protection signal, generating a driving signal based on at least information associated with the protection signal, and outputting the driving signal to a switch configured to affect the primary current flowing through the primary winding. The detected voltage is related to an output voltage of the power conversion system. The demagnetization signal is related to a demagnetization period of the power conversion system. The process for outputting a driving signal to a switch configured to affect the primary current flowing through the primary winding includes, if the detected voltage, the demagnetization signal and the current-sensing signal satisfy one or more conditions, outputting the driving signal to cause the switch to open and remain open in order to protect the power conversion system. For example, the method is implemented according to at least FIG. 12, FIG. 13, FIG. 14, and/or FIG. 15.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for protecting a power conversion system, the system controller comprising:
   a protection component configured to receive a demagnetization signal generated based on at least information associated with a feedback signal of the power conversion system, process information associated with the demagnetization signal and a detected voltage generated based on the at least information associated with the feedback signal, and generate a protection signal based on at least information associated with the detected voltage and the demagnetization signal; and
   a driving component configured to receive the protection signal and output a driving signal to a switch configured to affect a primary current flowing through a primary winding of the power conversion system;
   wherein:
      the detected voltage is related to an output voltage of the power conversion system; and
      the demagnetization signal is related to a demagnetization period of the power conversion system;
   wherein the protection component and the driving component are further configured to, if the detected voltage and the demagnetization signal satisfy one or more conditions, output the driving signal to cause the switch to open and remain open in order to protect the power conversion system; and
   wherein the detected voltage and the demagnetization signal satisfy the one or more conditions if the demagnetization period is smaller in duration than a threshold time period corresponding to the detected voltage.

2. The system controller of claim 1 wherein the protection component and the driving component are further configured to, if the detected voltage and the demagnetization signal satisfy the one or more conditions, shut down the system controller.

3. The system controller of claim 1 wherein the protection component is further configured to receive the detected voltage generated based on at least information associated with the feedback signal.

4. The system controller of claim 1 wherein the protection component is further configured to receive the feedback signal and generate the detected voltage based on at least information associated with the feedback signal.

5. The system controller of claim 1 wherein the duration of the threshold time period is inversely proportional to the detected voltage.

6. The system controller of claim 1 wherein the protection component includes a voltage detector configured to receive the feedback signal and generate the detected voltage based on the at least information associated with the feedback signal.

7. The system controller of claim 6 wherein the voltage detector is configured to receive the feedback signal from a voltage-signal generator coupled to an auxiliary winding of the power conversion system.

8. The system controller of claim 7 wherein the voltage-signal generator is configured to generate the feedback signal based on at least information associated with the output voltage, the output voltage being related to a secondary winding of the power conversion system.

9. The system controller of claim 8 wherein the secondary winding is configured to release energy during the demagnetization period.

10. The system controller of claim 6 wherein the protection component further includes:
    a timer-and-comparator component configured to receive the detected voltage and the demagnetization signal and generate the protection signal based on at least information associated with the detected signal and the demagnetization signal.

11. The system controller of claim 10 wherein the voltage detector includes:
    a sampling component configured to sample the feedback signal and generate a sampled signal; and
    a capacitor configured to receive the sampled signal and generate the detected voltage.

12. The system controller of claim 11 wherein the sampling component includes a switch.

13. The system controller of claim 1, and further comprising:
    a sample-and-hold component configured to receive the feedback signal and generate a sampled-and-held signal based on at least information associated with the feedback signal;
    an error amplifier configured to receive the sampled-and-held signal and generate an amplified signal based on at least information associated with the sampled-and-held signal; and
    a modulation component configured to receive the amplified signal and generate a modulation signal based on at least information associated with the amplified signal;
    wherein the driving component is further configured to receive a first signal associated with the modulation signal.

14. A system controller for protecting a power conversion system, the system controller comprising:
    a protection component configured to receive a demagnetization signal generated based on at least information associated with a feedback signal of the power conversion system, receive a current-sensing signal associated with a primary current flowing through a primary winding of the power conversion system, process information associated with the demagnetization signal, the current-sensing signal, and a detected voltage generated based on at least information associated with the feedback signal, and generate a protection signal based on at least information associated with the detected voltage, the demagnetization signal, and the current-sensing signal; and
    a driving component configured to receive the protection signal and output a driving signal to a switch configured to affect the primary current flowing through the primary winding;
    wherein:
       the detected voltage is related to an output voltage of the power conversion system; and
       the demagnetization signal is related to a demagnetization period of the power conversion system;
    wherein the protection component and the driving component are further configured to, if the detected voltage, the demagnetization signal and the current-sensing signal satisfy one or more conditions, output the driving signal to cause the switch to open and remain open in order to protect the power conversion system; and wherein the detected voltage, the demagnetization signal and the current-sensing signal satisfy the one or more conditions if the demagnetization period is smaller in duration than a threshold time period corresponding to the detected voltage and the current-sensing signal.

15. The system controller of claim 14 wherein the protection component and the driving component are further configured to, if the detected voltage, the demagnetization signal and the current-sensing signal satisfy the one or more conditions, shut down the system controller.

16. The system controller of claim 14 wherein the protection component is further configured to receive the detected voltage generated based on at least information associated with the feedback signal.

17. The system controller of claim 14 wherein the protection component is further configured to receive the feedback signal and generate the detected voltage based on at least information associated with the feedback signal.

18. The system controller of claim 14 wherein a duration of the threshold time period is inversely proportional to the detected voltage.

19. The system controller of claim 14 wherein the protection component includes a voltage detector configured to receive the feedback signal and generate the detected voltage based on at least information associated with the feedback signal.

20. The system controller of claim 19 wherein the voltage detector is configured to receive the feedback signal from a voltage-signal generator coupled to an auxiliary winding of the power conversion system.

21. The system controller of claim 20 wherein the voltage-signal generator is configured to generate the feedback signal based on at least information associated with the output voltage, the output voltage being related to a secondary winding of the power conversion system.

22. The system controller of claim 21 wherein the secondary winding is configured to release energy during the demagnetization period.

23. The system controller of claim 19 wherein the protection component further includes:
a peak-detection component configured to receive the current-sensing signal and generate a threshold signal based on at least information associated with the current-sensing signal; and
a timer-and-comparator component configured to receive the detected voltage, the demagnetization signal and the threshold signal and generate the protection signal based on at least information associated with the detected signal, the demagnetization signal and the threshold signal.

24. The system controller of claim 23 wherein the voltage detector includes:
a sampling component configured to sample the feedback signal and generate a sampled signal; and
a capacitor configured to receive the sampled signal and generate the detected voltage.

25. The system controller of claim 24 wherein the sampling component includes a switch.

26. The system controller of claim 14, and further comprising:
a sample-and-hold component configured to receive the feedback signal and generate a sampled-and-held signal based on at least information associated with the feedback signal;
an error amplifier configured to receive the sampled-and-held signal and generate an amplified signal based on at least information associated with the sampled-and-held signal; and
a modulation component configured to receive the amplified signal and generate a modulation signal based on at least information associated with the amplified signal;
wherein the driving component is further configured to receive a first signal associated with the modulation signal.

27. A method for protecting a power conversion system, the method comprising:
receiving a demagnetization signal generated based on at least information associated with a feedback signal of the power conversion system;
processing information associated with the demagnetization signal and a detected voltage generated based on at least information associated with the feedback signal;
generating a protection signal based on at least information associated with the detected voltage and the demagnetization signal;
receiving the protection signal;
generating a driving signal based on at least information associated with the protection signal; and
outputting the driving signal to a switch configured to affect a primary current flowing through a primary winding of the power conversion system;
wherein:
the detected voltage is related to an output voltage of the power conversion system; and
the demagnetization signal is related to a demagnetization period of the power conversion system;
wherein the process for outputting a driving signal to a switch configured to affect a primary current flowing through a primary winding of the power conversion system includes, if the detected voltage and the demagnetization signal satisfy one or more conditions, outputting the driving signal to cause the switch to open and remain open in order to protect the power conversion system; and
wherein the detected voltage and the demagnetization signal satisfy the one or more conditions if the demagnetization period is smaller in duration than a threshold time period corresponding to the detected voltage.

28. A method for protecting a power conversion system, the method comprising:
receiving a demagnetization signal generated based on at least information associated with a feedback signal of the power conversion system;
receiving a current-sensing signal associated with a primary current flowing through a primary winding of the power conversion system;
processing information associated with the demagnetization signal, the current-sensing signal, and a detected voltage generated based on at least information associated with the feedback signal;
generating a protection signal based on at least information associated with the detected voltage, the demagnetization signal, and the current-sensing signal;
receiving the protection signal;
generating a driving signal based on at least information associated with the protection signal; and
outputting the driving signal to a switch configured to affect the primary current flowing through the primary winding;
wherein:

the detected voltage is related to an output voltage of the power conversion system; and the demagnetization signal is related to a demagnetization period of the power conversion system;

wherein the process for outputting a driving signal to a switch configured to affect the primary current flowing through the primary winding includes, if the detected voltage, the demagnetization signal and the current-sensing signal satisfy one or more conditions, outputting the driving signal to cause the switch to open and remain open in order to protect the power conversion system; and wherein the detected voltage, the demagnetization signal and the current-sensing signal satisfy the one or more conditions if the demagnetization period is smaller in duration than a threshold time period corresponding to the detected voltage and the current-sensing signal.

* * * * *